(12) United States Patent
Hatano

(10) Patent No.: US 8,020,198 B2
(45) Date of Patent: Sep. 13, 2011

(54) NETWORK DEVICE MANAGEMENT APPARATUS AND NETWORK DEVICE MANAGEMENT METHOD

(75) Inventor: Manami Hatano, Yokohama (JP)

(73) Assignee: Canon Kabushiki Kaisha (JP)

( * ) Notice: Subject to any disclaimer, the term of this patent is extended or adjusted under 35 U.S.C. 154(b) by 893 days.

(21) Appl. No.: 12/017,670

(22) Filed: Jan. 22, 2008

(65) Prior Publication Data

US 2008/0216162 A1 Sep. 4, 2008

(30) Foreign Application Priority Data

Jan. 23, 2007 (JP) .................................. 2007-012962

(51) Int. Cl.
G06F 7/04 (2006.01)
G06F 17/30 (2006.01)
G06F 15/163 (2006.01)

(52) U.S. Cl. ............... 726/7; 726/20; 709/223; 709/224

(58) Field of Classification Search .................. None
See application file for complete search history.

(56) References Cited

U.S. PATENT DOCUMENTS

| | | | | |
|---|---|---|---|---|
| 5,684,957 A * | 11/1997 | Kondo et al. | ................... | 726/25 |
| 6,160,988 A * | 12/2000 | Shroyer | .......................... | 725/63 |
| 6,591,273 B2 * | 7/2003 | Jenkins et al. | ........................ | 1/1 |
| 6,804,816 B1 * | 10/2004 | Liu et al. | ....................... | 719/311 |
| 7,266,601 B2 | 9/2007 | Maekawa et al. | | |

FOREIGN PATENT DOCUMENTS

| | | |
|---|---|---|
| JP | 2000-353140 A | 12/2000 |
| JP | 2003-15973 A | 1/2003 |
| JP | 2003-108448 A | 4/2003 |
| JP | 2005-141772 A | 6/2005 |

* cited by examiner

Primary Examiner — Kambiz Zand
Assistant Examiner — William Powers
(74) Attorney, Agent, or Firm — Rossi, Kimms & McDowell LLP

(57) ABSTRACT

A network device management apparatus according to this invention is directed to a network device management apparatus, which is connected to a network and manages a network device connected to the network, acquires status information indicating the status of the network device from the network device, saves the acquired status information in a storage unit, randomly generates an address required to access the storage unit, and notifies a pre-registered destination of the generated address, and provides, when an access is made to the address, the status information saved in the storage unit to an accessing party.

8 Claims, 36 Drawing Sheets

FIG. 5

```
BROWSER -- Network Device Management                    _ □ X
FILE(F)  EDIT(E)  VIEW(V)  BOOKMARK(B)  TOOL(T)  WINDOW(W)  HELP(H)
[Http://devmngr/regadmin/]

ADMINISTRATOR REGISTRATION                                  501
REGISTER ADMINISTRATOR BY ENTERING FOLLOWING INFORMATION. TO SET MAIL
NOTIFICATION, PLEASE SET KEYWORD. (ADDITIONAL SETTING IS POSSIBLE LATER.)

[  OK  ]  [ CANCEL ] — 502, 503

LOGIN NAME : [_____] — 504
                  NAME (LAST NAME) : [_____] — 505
                 NAME (FIRST NAME) : [_____] — 506
                         PASSWORD : [_____] — 507
         PASSWORD (CONFIRMATION ENTRY) : [_____] — 508
                MAIL NOTIFICATION : □ NOTIFY — 509
          MAIL NOTIFICATION KEYWORD : [_____] — 510
MAIL NOTIFICATION KEYWORD (CONFIRMATION ENTRY) : [_____] — 511
                     MAIL ADDRESS : [_____] — 512
     MAIL ADDRESS (CONFIRMATION ENTRY) : [_____] — 513

READY
```

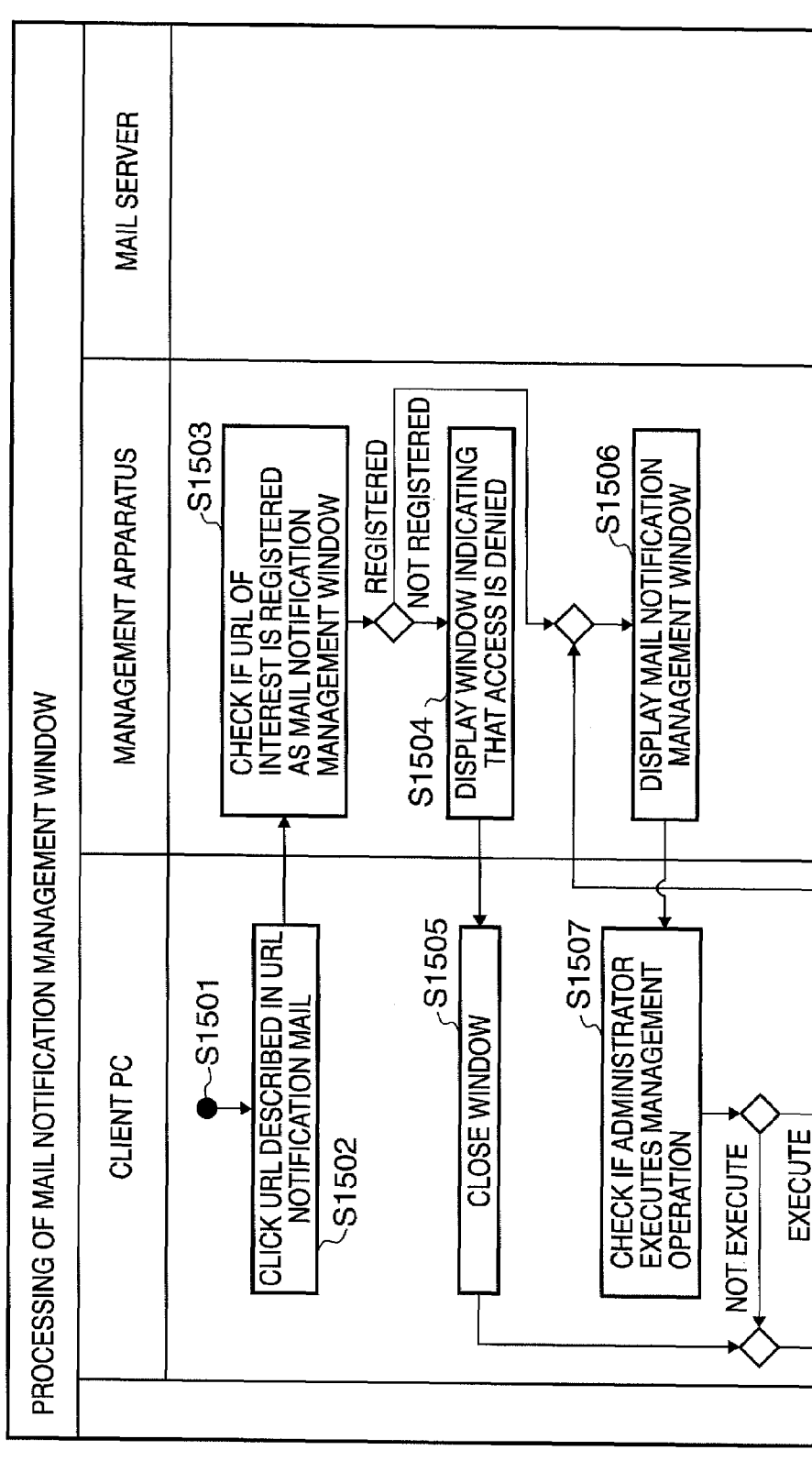

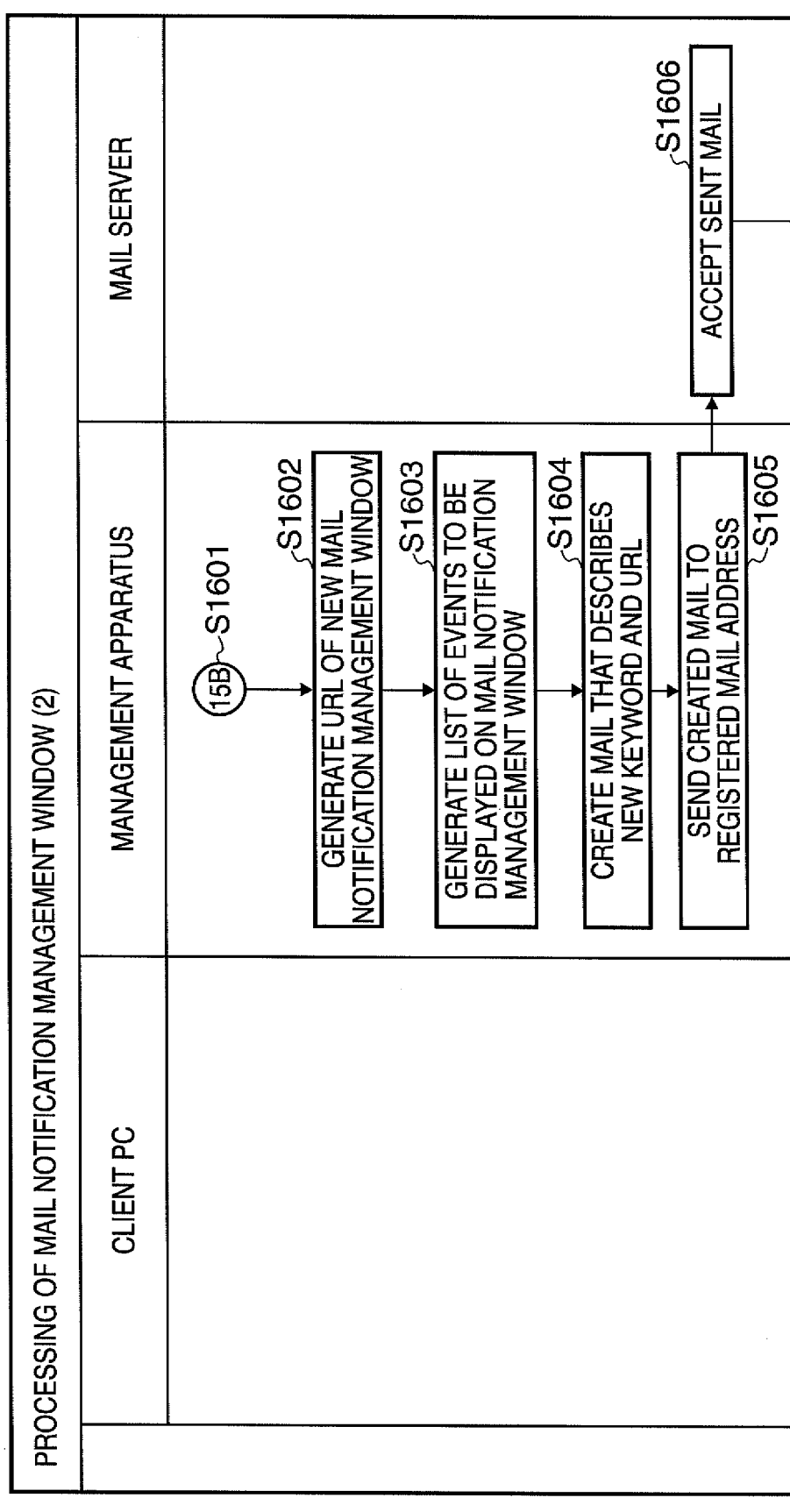

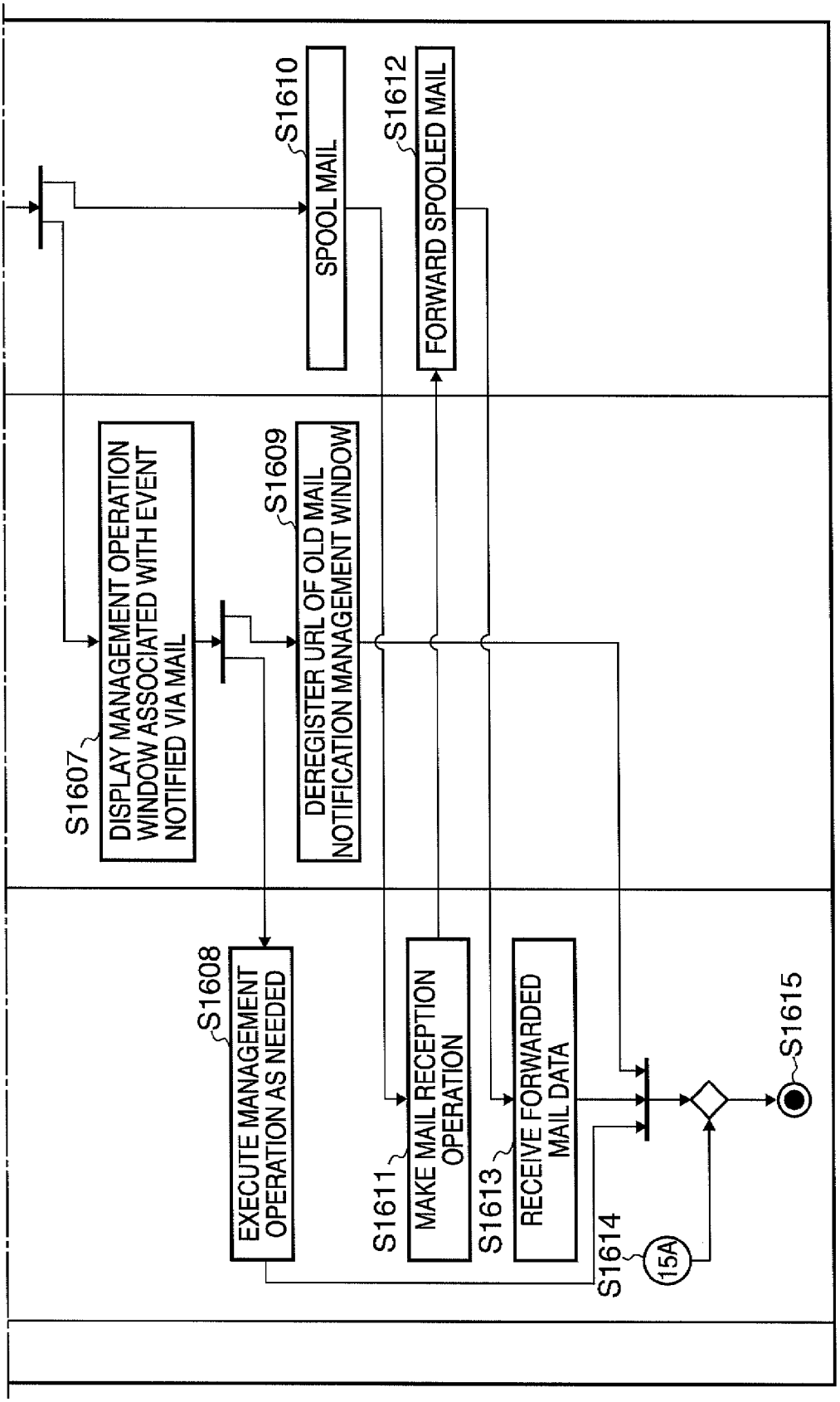

FIG. 18

BROWSER – Network Device Managemant

FILE(F) EDIT(E) VIEW(V) BOOKMARK(B) TOOL(T) WINDOW(W) HELP(H)

http://devmngr.address.example/x098Nwp3/

MAIL NOTIFICATION LOG
THIS IS LIST OF EVENTS NOTIFIED SO FAR. TO EXECUTE MANAGEMENT OPERATION, PLEASE ENTER PASSWORD AND NEW MAIL NOTIFICATION KEYWORD AND PRESS "OK" BUTTON.

PASSWORD: ⬚ — 1802
MAIL NOTIFICATION KEYWORD: ⬚ — 1803
MAIL NOTIFICATION KEYWORD (CONFIRMATION ENTRY): ⬚ — 1804

[OK] — 1806  [CANCEL] — 1805

1801
1807

| TYPE | DATE AND TIME OF OCCURRENCE | DEVICE NAME | STATUS |
|---|---|---|---|
| ALERT | 2006/4/23 17:23:36 | MFP-3900TR | SMALL REMAINING PAPER QUANTITY |
| ERROR | 2006/4/23 17:23:36 | LBP-7200 | OUT OF TONER |
| ALERT | 2006/4/22 16:11:52 | MFP-2900XT | SMALL REMAINING TONER AMOUNT |
| ALERT | 2006/4/21 08:45:19 | LBP-7200 | SMALL REMAINING TONER AMOUNT |
| ERROR | 2006/4/18 13:03:28 | LBP-3200XP | NO RESPONSE |

READY

FIG. 21

BROWSER ? Network Device Management

FILE(F) EDIT(E) VIEW(V) BOOKMARK(B) TOOL(T) WINDOW(W) HELP(H)

http://devmngr.address.example/x098Nwp3/

MAIL NOTIFICATION LOG                                    ADMINISTRATOR MODE

THIS IS LIST OF EVENTS NOTIFIED SO FAR. TO EXECUTE MANAGEMENT OPERATION OF EACH INDIVIDUAL DEVICE, PLEASE PRESS SETTING BUTTON TO PROCEED TO SETTING WINDOW

| TYPE | DATE AND TIME OF OCCURRENCE | DEVICE NAME | STATUS | SETTING |
|---|---|---|---|---|
| ALERT | 2006/4/23 17:23:36 | MFP-3900TR | SMALL REMAINING PAPER QUANTITY | SETTING |
| ERROR | 2006/4/23 17:23:36 | LBP-7200 | OUT OF TONER | SETTING |
| ALERT | 2006/4/22 16:11:52 | MFP-2900XT | SMALL REMAINING TONER AMOUNT | SETTING |
| ALERT | 2006/4/21 08:45:19 | LBP-7200 | SMALL REMAINING TONER AMOUNT | SETTING |
| ERROR | 2006/4/18 13:03:28 | LBP-3200XP | NO RESPONSE | SETTING |

READY 2101, 2102, 2103, 2104

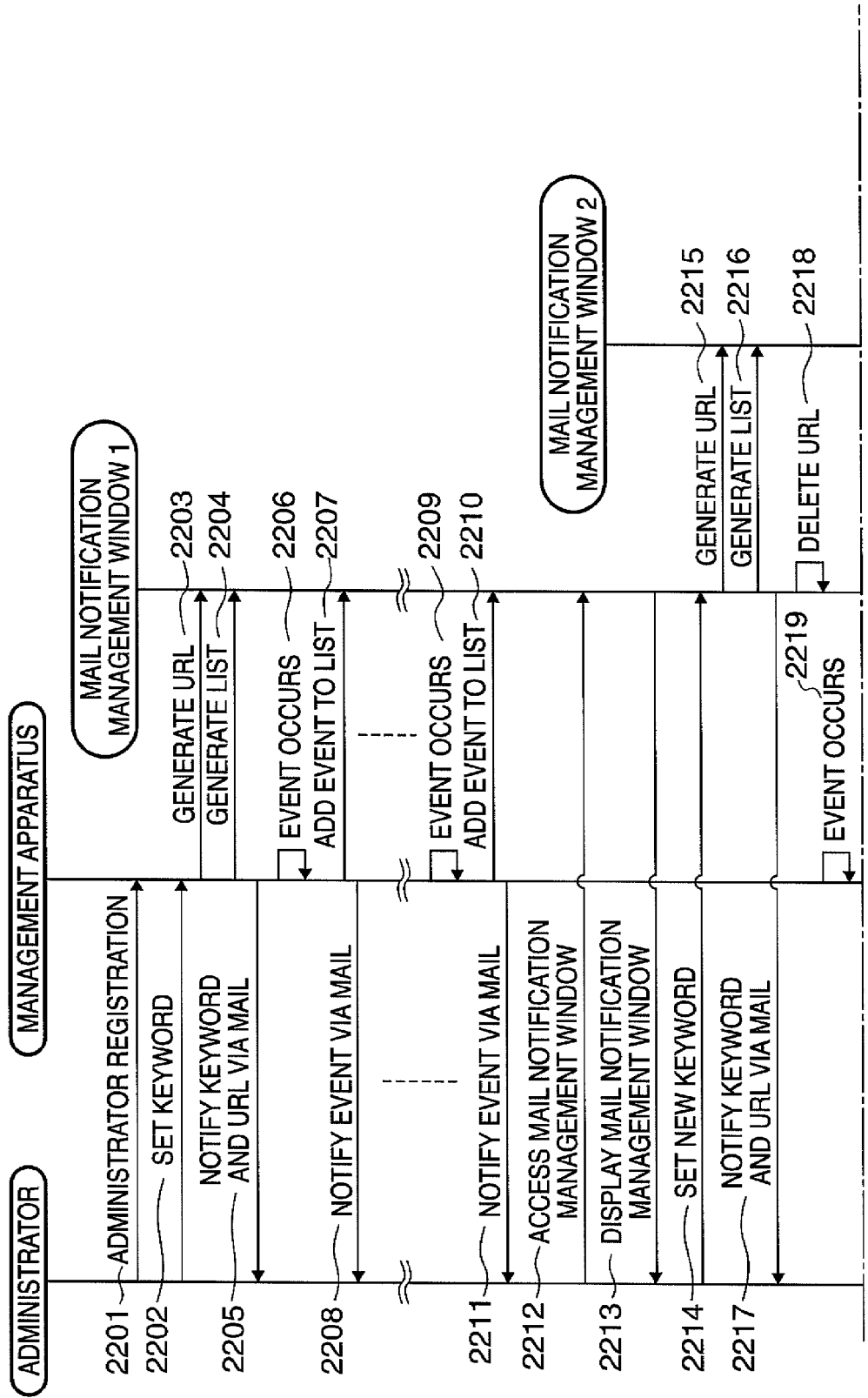

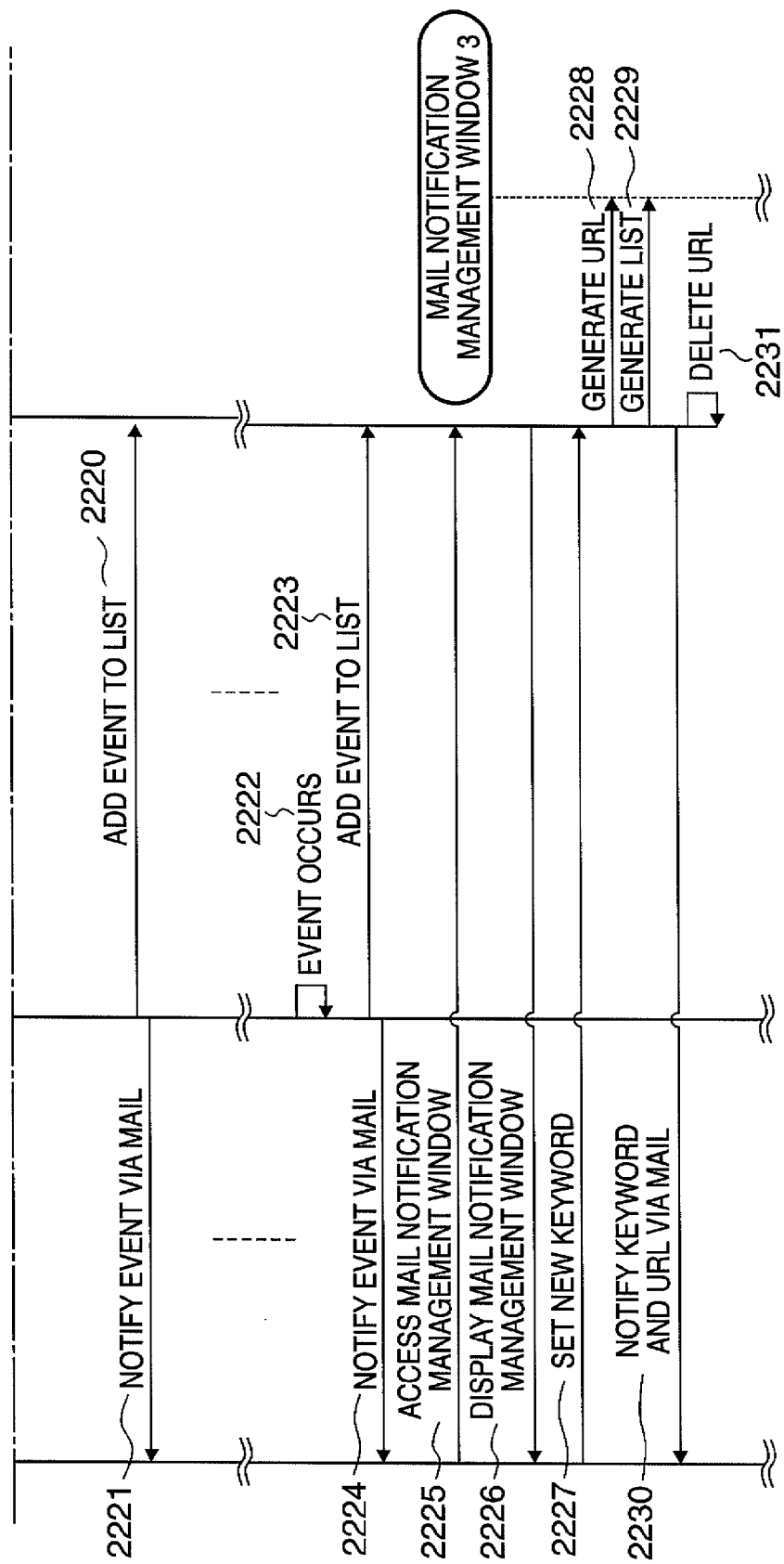

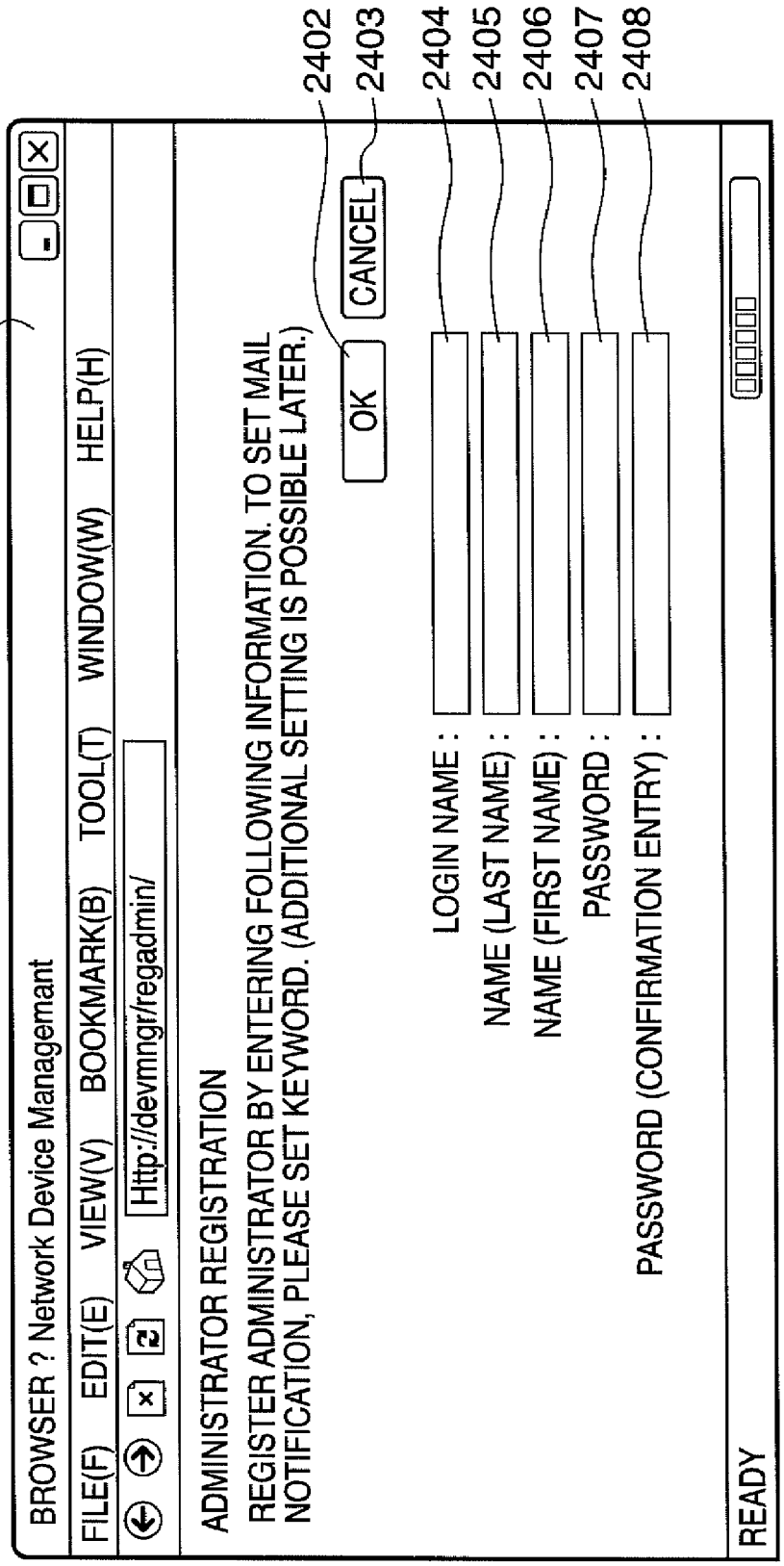

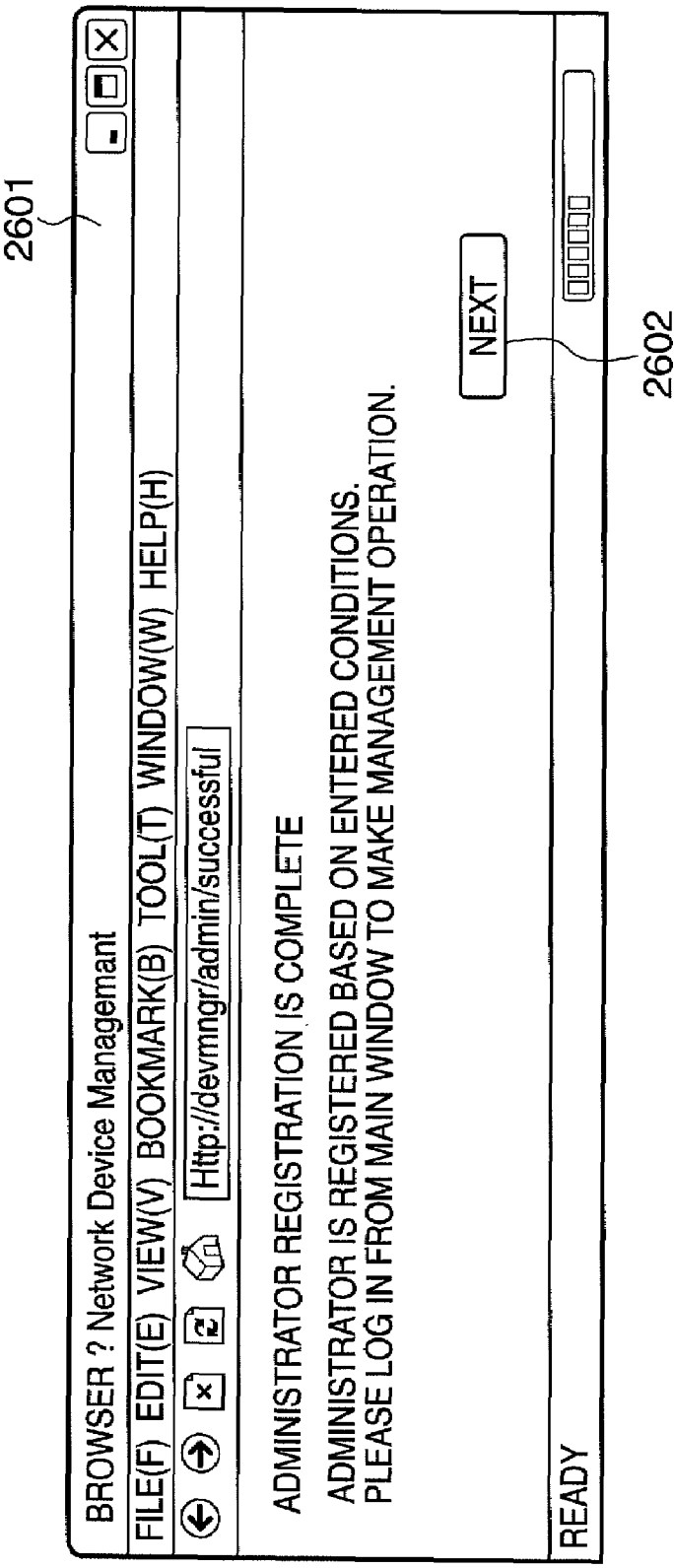

```
BROWSER ? Network Device Managemant                    _ □ ×
FILE(F) EDIT(E) VIEW(V) BOOKMARK(B) TOOL(T) WINDOW(W) HELP(H)
            Http://devmngr/admin/mailcond
```

MAIL NOTIFICATION CONDITION SETTING       ADMINISTRATOR MODE

MAIL NOTIFICATION WILL BE MADE UNDER CONDITION — 2802
ACCORDING TO FOLLOWING ITEMS

- MAIL NOTIFICATION KEYWORD: [         ] — 2803
- MAIL NOTIFICATION KEYWORD: [         ] — 2804
  (CONFIRMATION ENTRY)
- MAIL ADDRESS: [         ] — 2805
- MAIL ADDRESS (CONFIRMATION ENTRY): [         ] — 2806

2807 — [ OK ]   [ CANCEL ] — 2808

MAIL NOTIFICATION: ☑ ERROR
- ☑ PAPER JAM
- ☑ OUT OF TONER
- ☑ OUT OF PAPER
- ☑ OUTPUT TRAY FULL
- ☑ NO RESPONSE
- ☑ OUT OF STAPLE

☑ ALERT
- ☑ SMALL REMAINING PAPER QUANTITY
- ☑ SMALL REMAINING TONER AMOUNT
- ☐ SMALL OUTPUT TRAY REMAINING CAPACITY
- ☐ SMALL STAPLE REMAINING AMOUNT

MAIL NOTIFICATION :
TARGET DEVICE

- ☐ MFP-5000R2
- ☑ LBP-3200XP
- ☐ LBP-2910Z
- ☑ MFP-3900TR
- ☐ FAX-2700UII
- ☐ ICR-3900RZ
- ☑ MFP-2900XT
- ☐ LBP-3200R
- ☑ LBP-7200
- ☐ LBP-1900TS
- ☐ MFP-2900TY 2809
2810

[ SELECT ALL ] — 2811
[ DESELECT ALL ] — 2812

READY

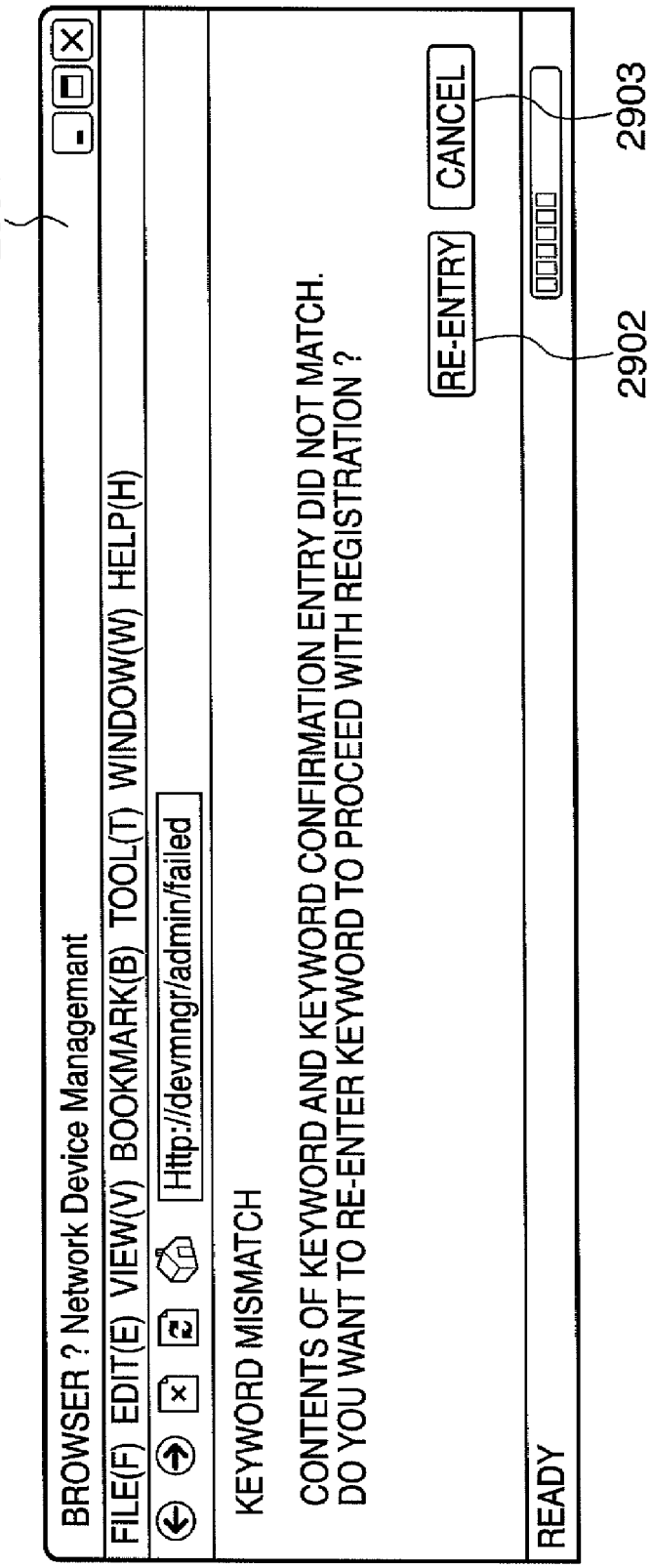

NETWORK DEVICE MANAGEMENT APPARATUS AND NETWORK DEVICE MANAGEMENT METHOD

BACKGROUND OF THE INVENTION

1. Field of the Invention

The present invention relates to an apparatus and method for managing devices on a network.

2. Description of the Related Art

Conventionally, a management apparatus, which forms a user interface using HTTP (HyperText Transfer Protocol) and HTML (HyperText Markup Language) to be configured to operate as a Web server, and manages network devices, is available. The network devices are peripheral devices connected to a network, and include printers, digital MFPs, and the like. Such management apparatus allows the user to execute a management operation from a personal computer (to be abbreviated as "PC" hereinafter) serving as a client via a Web browser (see Japanese Patent Laid-Open No. 2000-353140 (FIG. 2)) Some of network device management apparatuses of this type detect the occurrence of a status or event to which the administrator should give an attention, e.g., the occurrence of a trouble, and notify the administrator of the occurrence of that event via e-mail (for example, see Japanese Patent Laid-Open No. 2003-015973 (FIG. 16)).

Some of e-mail messages for such notification describe a URL (Universal Resource Locator) used to directly access a management window in their body text. Upon reception of such e-mail message, the administrator clicks or double-clicks on the URL described in the mail message to directly display the management window of the network device management apparatus, and can execute the management operation via that window (for example, see Japanese Patent Laid-Open No. 2003-108448 (FIG. 7)).

Also, another management apparatus assigns an identifier unique to each notification to an e-mail message that notifies of the occurrence of an event or status, generates a unique URL according to a reply from the administrator who received this identifier via e-mail, and sends it to the administrator (for example, see Japanese Patent Laid-Open No. 2005-141772 (FIG. 2)). With this configuration, only the administrator who received the e-mail message can view that management window.

SUMMARY OF THE INVENTION

On the other hand, fraudulent practices, in which one sends the URL of a disguised Web site to recipients via e-mail to guide them to the disguised Web site, and picks login information entered on that site are widespread in recent years. Such practice is generally called "phishing".

PCs and servers connected to a network which runs within a single organization (to be referred to as an Intranet hereinafter) are relatively vulnerable to attacks from inside the Intranet to which they belong. For this reason, phishing within the Intranet is relatively easy.

When an ill-intentioned user who intends to guide users to a disguised server exists in the Intranet, it is possible to attack users by phishing. If a phishing attack that disguises an event notification e-mail message which is sent from the network management apparatus to clients is made, sensitive information such as a password required to access the network management apparatus is likely to be acquired from the administrator.

In this way, including the URL in a notification e-mail message from the network management apparatus gives rise to a potential of being targets of phishing attacks, and poses a serious threat to security in the Intranet. For this reason, in such a system, if the administrator receives a notification of the occurrence of an event, he or she must verify its authenticity, thus imposing a heavy load on the administrator.

The present invention has been made in consideration of the aforementioned related arts, and has as its object to provide a network device management apparatus and network device management method, which can improve security against theft of confidential information such as an administrator password and the like.

In order to achieve the above object, the present invention comprises the following arrangement. That is, there is provided a network device management apparatus which is connected to a network, and manages network devices connected to the network, comprising:

an acquisition unit, configured to acquire status information indicating a status of a network device from the network device;

an event saving unit, configured to save the status information acquired by the acquisition unit in a storage unit;

an address notification unit, configured to randomly generate an address required to access the storage unit, and to notify a pre-registered destination of the generated address;

an event notification unit, configured to notify, when the status information is acquired, the destination of occurrence of the status; and an information providing unit, configured to provide, when an access is made to the address, the status information saved in the storage unit to an accessing party.

According to the present invention, there can be provided a network device management apparatus and network device management method which can improve security against theft of confidential information such as an administrator password and the like.

Further features of the present invention will become apparent from the following description of exemplary embodiments with reference to the attached drawings.

BRIEF DESCRIPTION OF THE DRAWINGS

FIG. 5 is a view showing an administrator registration window of the network device management apparatus according to the first embodiment;

FIGS. 15A and 15B are flowcharts showing a part of the sequence of the mail notification management window processing of the network device management apparatus according to the first and second embodiments;

FIGS. 16A and 16B are flowcharts showing a part of the sequence of the mail notification management window processing of the network device management apparatus according to the first and second embodiments;

FIG. 18 is a view showing a mail notification management window of the network device management apparatus according to the first and second embodiments;

FIG. 21 is a view showing a management operation window switched from the mail notification management window of the network device management apparatus according to the first and second embodiments;

FIGS. 22A and 22B are diagrams which briefly summarize the processing associated with mail notification in the network device management apparatus according to the first and second embodiments;

FIG. 24 is a view sowing an administrator registration window of the network device management apparatus according to the second embodiment;

FIG. 26 is a view showing an administrator registration processing completion window of the network device management apparatus according to the second embodiment;

FIG. 28 is a view showing a mail notification condition setting window of the network device management apparatus according to the second embodiment;

FIG. 29 is a view showing an error notification window indicating a keyword mismatch of the network device management apparatus according to the second embodiment.

DESCRIPTION OF THE EMBODIMENTS

First Embodiment

<System and Apparatus Arrangements>

Figure 1:
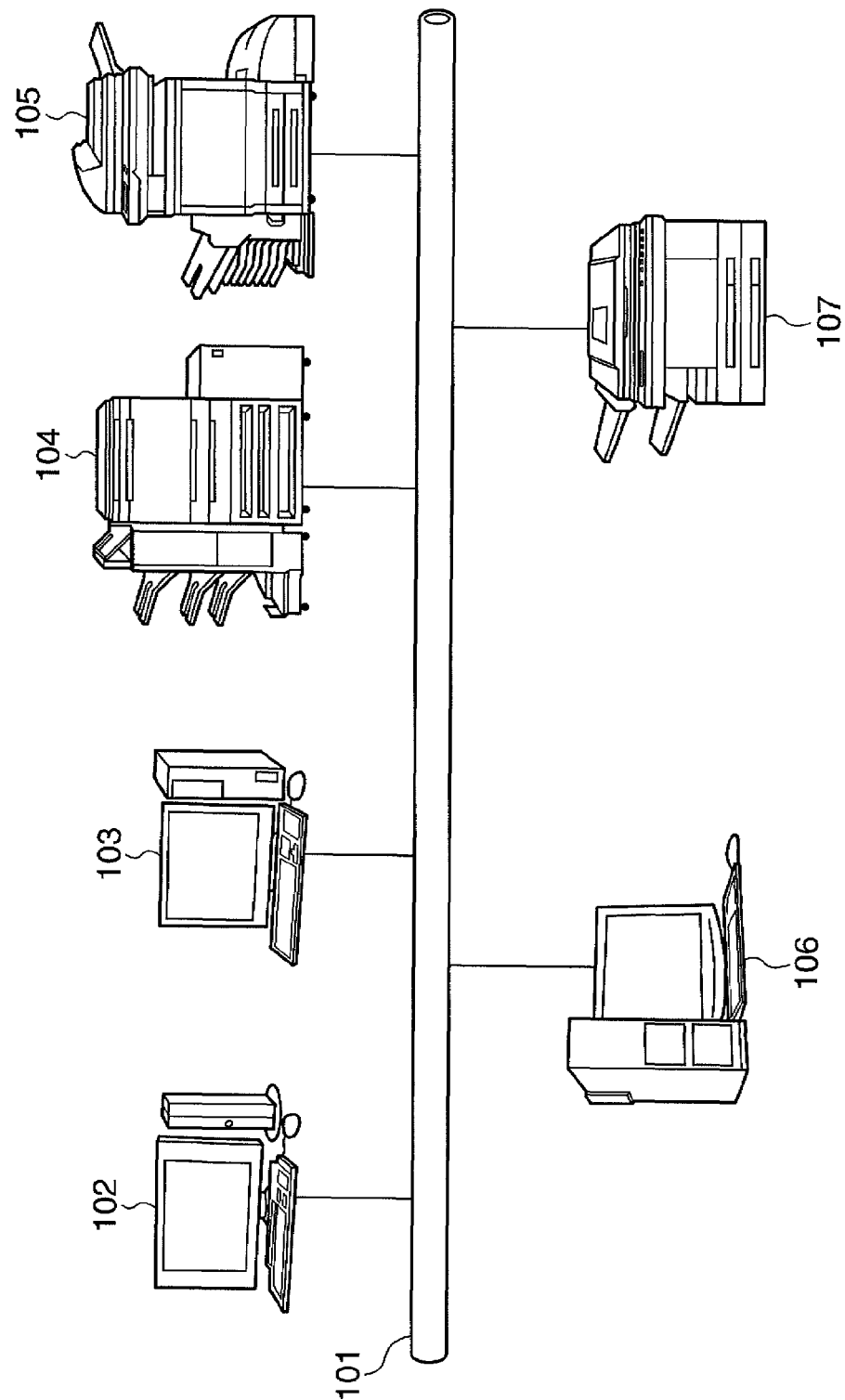
FIG. 1 is a diagram showing the arrangement of a network to which a network device management apparatus according to the first and second embodiments is connected.

FIG. 1 is a diagram showing the arrangement of a network to which a network device management apparatus of this embodiment is connected. A network 101 connects devices, computers, and the like. Client PCs 102 and 103 are always used by normal users, and serve as clients of the management apparatus.

Multifunctional printers 104, 105, and 107 are connected to the network 101, and execute printing and copying functions in response to print requests from the client PCs and the like. The multifunctional printer will also be referred to as an MFP hereinafter. A server 106 is a server apparatus which serves as a network management apparatus. Therefore, the server 106 will also be referred to as a network device management apparatus or simply a management apparatus hereinafter.

Figure 2:
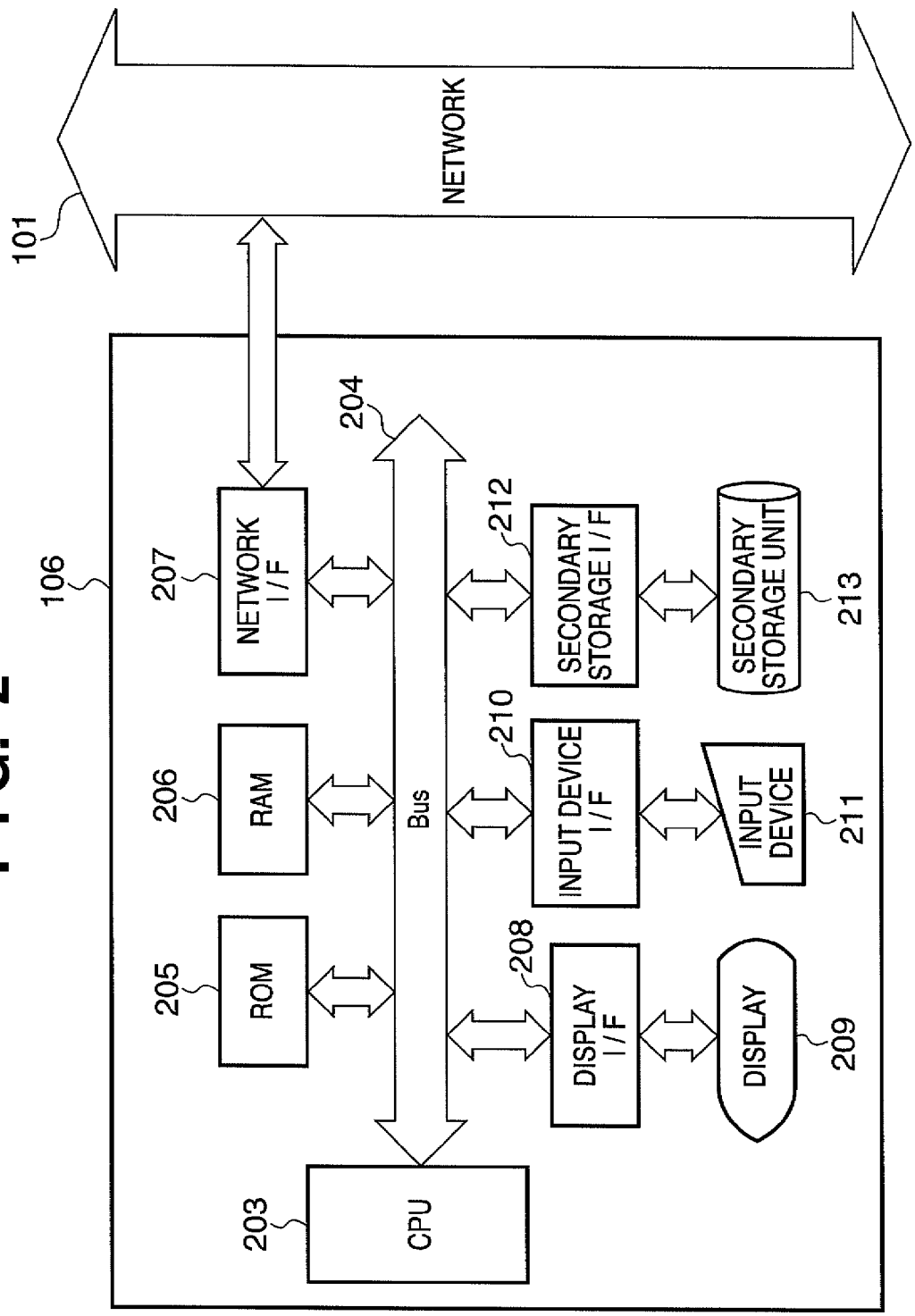
FIG. 2 is a block diagram showing the internal arrangement of a server apparatus, which serve as a network device management apparatus according to the first and second embodiments, and a client PC.

FIG. 2 is a block diagram showing the internal arrangement of the server apparatus 106 which serves as the network device management apparatus of this embodiment. A central processing unit (to be abbreviated as "CPU" hereinafter) 203 executes programs to make the computer function as the network device management apparatus. A bus 204 connects the CPU and respective peripheral units. A ROM 205 is a read-only memory which stores programs and data. A RAM 206 serves as a main memory to which programs are loaded or which saves data. A network interface 207 is an interface (to be abbreviated as "I/F" hereinafter) required to connect the network 101. A display I/F 208 is an interface between a display device 209 and the bus 204. An input device I/F 210 is an interface between an input device 211 and the bus. A secondary storage I/F 212 is an interface between a secondary storage unit 213 and the bus. Note that the client PCs 102 and 103, which are normally used by users, have basically the same arrangement as that shown in FIG. 2. The secondary storage unit 213 is a hard disk or the like, and serves as a storage unit which stores status information indicating a device status. Furthermore, the secondary storage unit 213 also serves as a keyword saving unit which saves a keyword entered in advance.

Figure 3:
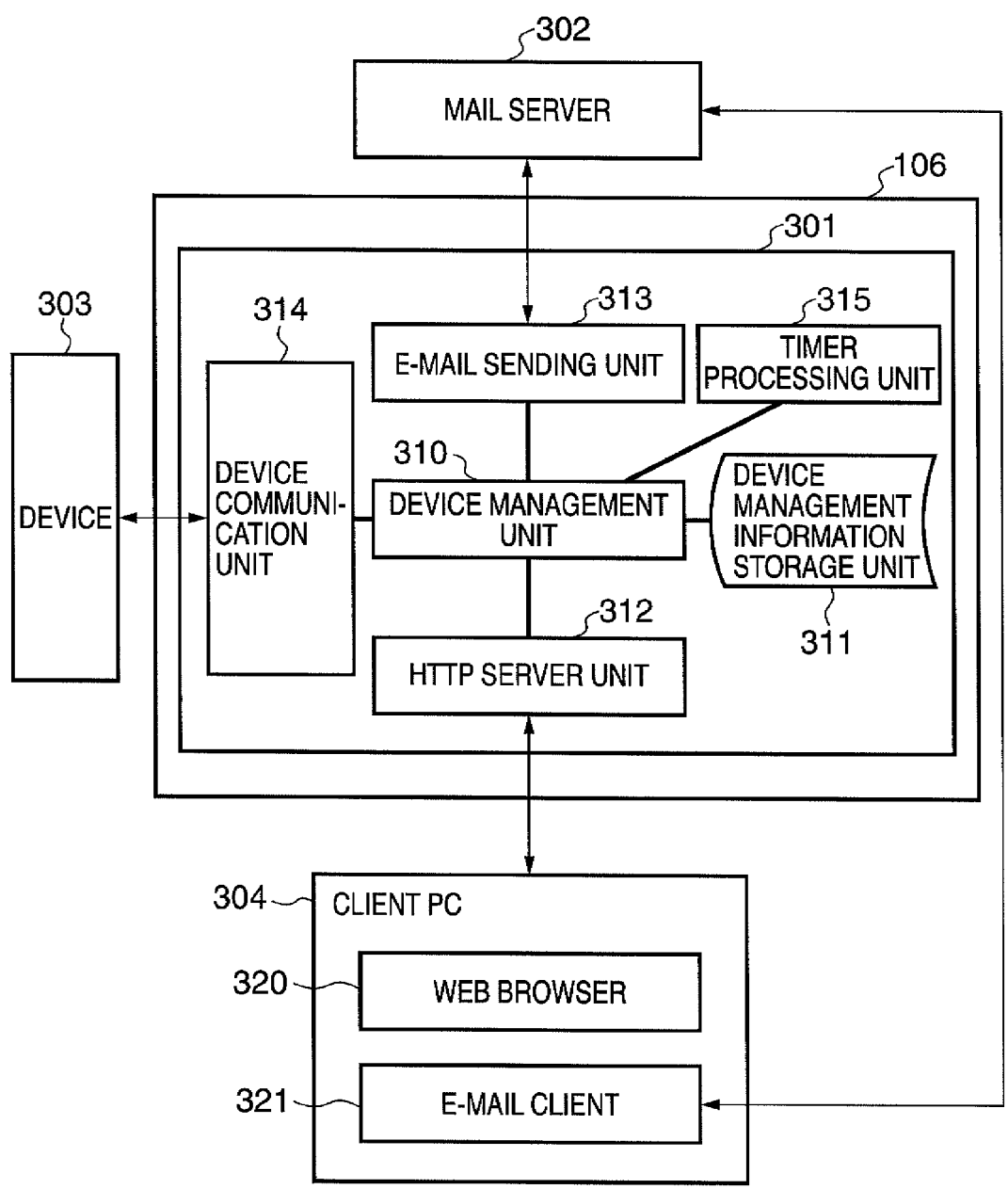
FIG. 3 is a block diagram showing the relationship between the network device management apparatus according to the first and second embodiments, and related modules.

FIG. 3 is a block diagram showing the software module configuration of the network device management apparatus 106 of this embodiment, and the related PC, server, and device. A management apparatus module 301 executes functions according to the present invention in the network management apparatus 106. A mail server 302 exists on the network. The mail server 302 may exist on the network device management apparatus 106 on which the management apparatus module 301 runs. In this case, the mail server runs independently of the management apparatus module 301. A device 303 corresponds to the MFPs 104, 105, and 107 shown in FIG. 1. A client PC 304 corresponds to the client PCs 102 and 103.

The management apparatus module 301 will be described in more detail below. A device management unit 310 executes device management operations. The functions of "management apparatus" shown in FIGS. 4A, 4B, 7, 11 to 13, 15A, 15B, 16A, 16B, 22A, 22B, 23A, 23B, 27A, 27B, 31, and the like are implemented by the device management unit 310. A device management information storage unit 311 stores information which must be saved upon execution of device management by the device management unit 310. An HTTP server unit 312 transmits information processed by the device management unit 310 to a Web browser 320, which runs on the client PC 304, using HTTP in response to an HTTP request from the client.

An e-mail sending unit 313 sends an e-mail message when the device management unit 310 wants to send an e-mail message. A device communication unit 314 makes a communication when the device management unit 310 wants to communicate with the device 303. A timer processing unit 315 provides, to the device management unit 310, time information required to execute processes that the device management unit 310 wants to execute when a given time is reached or repetitively at predetermined time intervals.

The client PC 304 will be described in detail below. The Web browser 320 communicates with the HTTP server unit 312 of the server to provide a user interface (to be abbreviated as "UI" hereinafter) required for the user to execute actual device management operations. An e-mail client 321 receives and displays a mail message addressed to the user, which has reached to the mail server 302, and sends a created reply or new mail message.

<Administrator Registration>

Figure 4A:
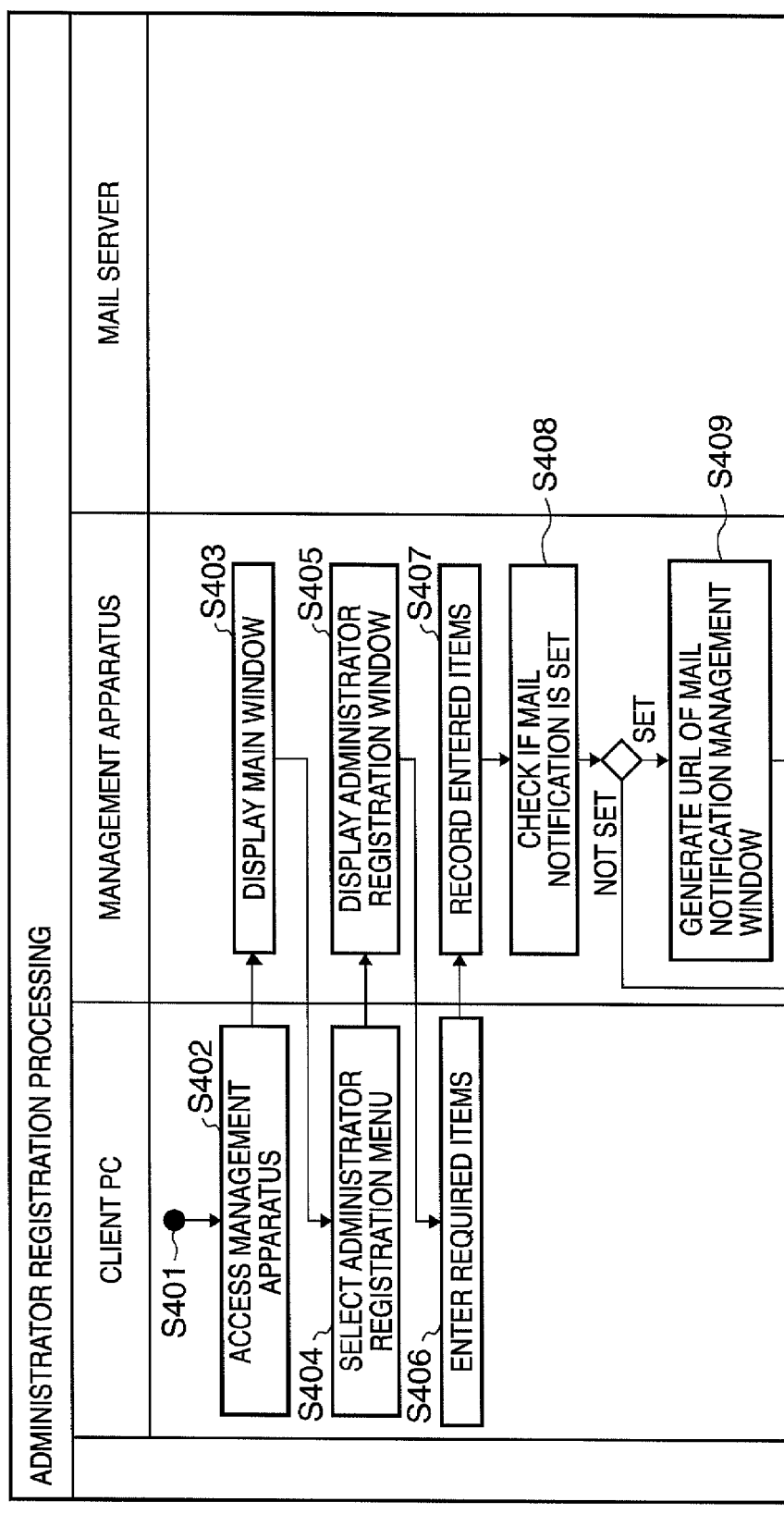
FIGS. 4A and 4B are flowcharts showing the sequence of the administrator registration processing of the network device management apparatus according to the first embodiment.
Figure 4B:
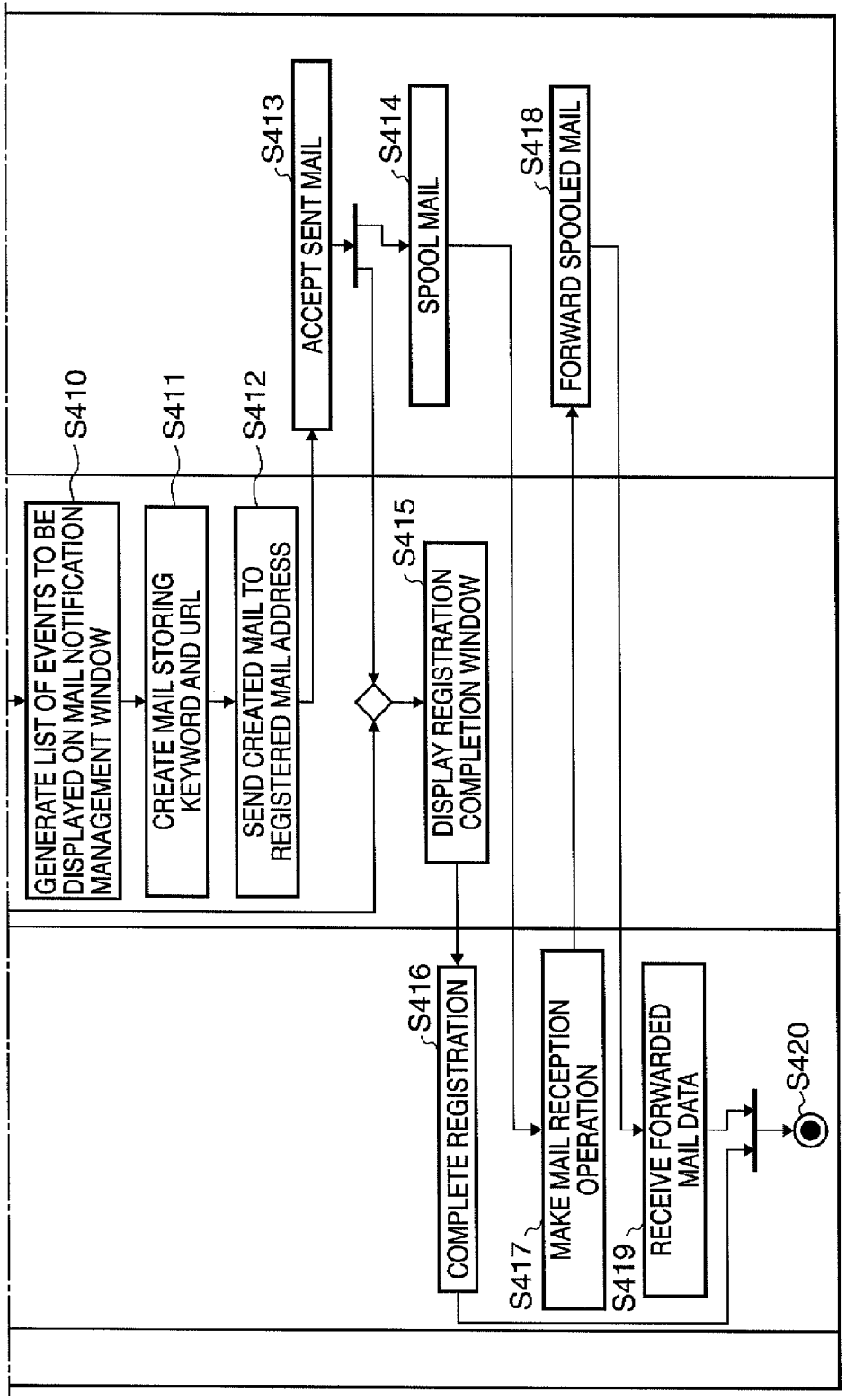

The sequence executed when the user makes administrator registration in the management apparatus of this embodiment will be described below with reference to FIGS. 4A and 4B.

The sequence starts from step S401. In step S402, the user opens the Web browser 320 on the client PC 304 and enters a URL for administrator registration. The Web browser 320 accesses the designated URL, i.e., the HTTP server unit 312 of the management apparatus 106. That is, the client PC 304 issues a message (an HTTP request in this case) to the HTTP server unit 312. In step S403, the device management unit 310 of the management apparatus 310 generates a window (main window) according to the designated URL, and returns a response (an HTTP response in this case) to the client PC 304 via the HTTP server unit 312.

Note that the case wherein the management apparatus 106 displays a certain window (Web page) will indicate the following sequence unless otherwise specified. Initially, the device management unit 310 generates window data that describes the window of interest. Note that the device management unit 310 need not generate window data when it displays an already generated window. The device management unit 310 transmits the window data to the client PC 304 via the HTTP server unit 312. The Web browser 320 on the client PC 304 displays that window data. Also, the "window" indicates that of the Web browser 320 displayed on the display unit 209 of the client PC 304 unless otherwise specified.

Next, the user selects an item required to make administrator registration from a menu of the main window in step S404.

The client PC 304 sends a message indicating the selected item to the management apparatus 106. In step S405, the management apparatus 106 which received the message generates an administrator registration window, and returns a response.

FIG. 5 shows an example of such administrator registration window. A window 501 is that of the Web browser. An OK button 502 is used to settle information entered for the administrator registration, and to complete the administrator registration. A cancel button 503 is used to abort the entry and to cancel the administrator registration. A text entry field 504 is used to enter a login name. A text entry field 505 is used to enter the last name of the name of the administrator. A text entry field 506 is used to enter the first name of the name of the administrator. A text entry field 507 is used to enter a password. An echo back of the value entered to the password entry field 507 is made using symbols "*" without displaying the entered value itself. A text entry field 508 is a password confirmation entry field used to re-enter the password so as to confirm if the user can accurately enter the password. A check box 509 is used to select whether or not to make mail notification. "Mail notification" means notification by mail in this specification. A text entry field 510 is used to enter a keyword used for mail notification. An echo back of the value entered to this entry field is made using symbols without displaying the entered value itself. A text entry field 511 is a keyword confirmation entry field used to re-enter the keyword so as to confirm if the user can accurately enter the keyword. A text entry field 512 is used to enter a mail address as a destination of mail notification. A text entry field 513 is a mail address confirmation entry field used to confirm if the user can accurately enter the mail address.

In step S406, the user enters required items to the administrator registration window and presses the OK button 502. In response to this operation, the client PC 304 sends the values of the entry items to the management apparatus 106. The entry items include user's choice about mail notification, the mail address used for mail notification, and the keyword used to notify a URL for mail notification. The mail address and keyword are mandatory entry items when the user selects a setting for making mail notification.

In step S407, the management apparatus 106 which received the values of the entry items records the received entry item values in the device management information recording unit 311. The apparatus 106 then checks in step S408 if the user selects the mail notification setting. Step S407 corresponds to a keyword saving step of saving a keyword entered in advance.

If the user selects the mail notification setting, the process advances to step S409 to generate a URL of a mail notification management window. This URL is required to display the mail notification management window when the administrator accesses later. In step S410, the management apparatus 106 generates a list of events to be displayed on the mail notification management window. For example, the apparatus 106 generates a domain name by appending a random character string having a length within a predetermined range to the domain name of the server 106.

Upon completion of generation of the list, the management apparatus 106 creates an e-mail message, which describes the keyword entered by the user in step S406 and the URL of the mail notification management window generated in step S409, in step S411.

In step S412, the management apparatus 106 sends the e-mail message created in step S411 to the mail notification mail address entered by the user in step S406. Steps S409 to S411 correspond to an address notification step of notifying an address required to access the storage unit to a pre-registered destination. The management apparatus 106 which executes this step corresponds to an address notification unit.

In step S413, the mail server 302 accepts the e-mail message sent by the management apparatus 106 in step S412. After that, the mail server 302 spools the accepted mail message in step S414, while the management apparatus display a registration completion window in step S415. In this way, the administrator registration processing in the client PC 304 is complete. Upon completion of the administrator registration, the process advances to step S420.

On the other hand, the mail server 302 spools the mail message in step S414, and then delivers the e-mail message to the destination. The e-mail client 321 of the client PC 304 performs a reception operation of the delivered e-mail message in step S417. The mail server 302 forwards the spooled mail message in response to a request from the e-mail client 321 in step S418. The client PC 304 receives the forwarded mail data in step S419. The process then advances to step S420, thus ending the processing.

Figure 6:
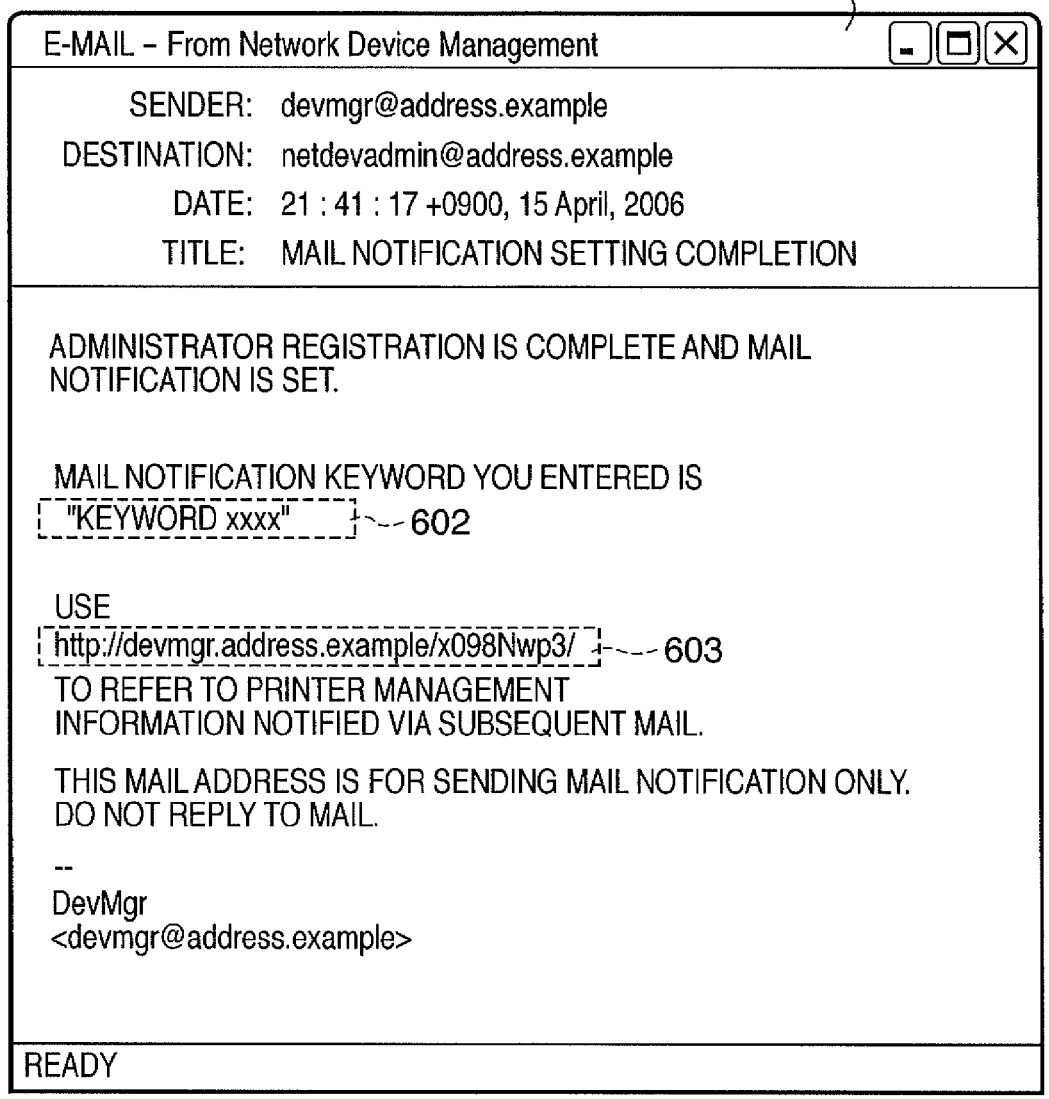
FIG. 6 is a view showing the contents of a URL notification mail message sent by the network device management apparatus according to the first embodiment.

FIG. 6 shows the mail message received in this way. A window 601 is that which displays the received mail message of the e-mail client 321. A keyword 602 is embedded in body text and is entered to the entry field 510 in step S406. The user confirms whether or not the keyword 602 described in this mail message matches the keyword that he or she entered in step S406, thereby determining if this mail message is correctly sent from the management apparatus 106. A URL 603 is embedded in the mail body text, and corresponds to a window showing details of an event such as an error or the like upon reception of the notification of that event. The user accesses this URL to refer to details of an event such as an error or the like.

<Mail Notification Condition Setting>

Figure 7:
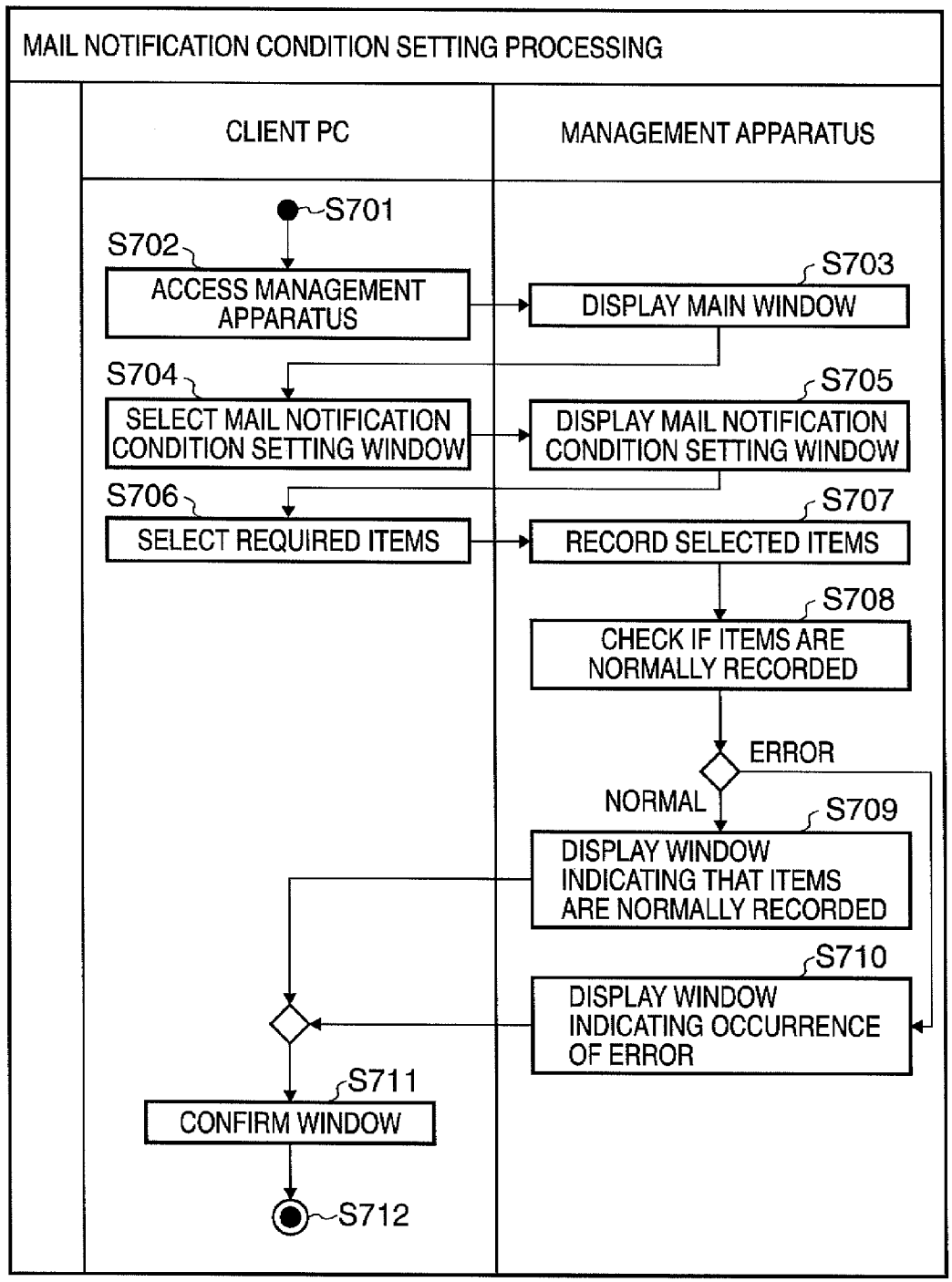
FIG. 7 is a flowchart showing the sequence of the mail notification condition setting processing of the network device management apparatus according to the first embodiment.

The sequence executed when the administrator makes detailed mail notification condition settings in the management apparatus of this embodiment will be described below with reference to FIG. 7.

The client PC 304 starts this processing in step S701. In step S702, the client PC 304 accesses the management apparatus 106. The accessing destination is a destination (e.g., a URL) determined in advance to set the mail notification condition. In step S703, the management apparatus 106 displays the main window in response to a request from the client. In step S704, the user selects a main notification condition setting window from the window displayed on the client PC 304. In response to this selection, the management apparatus 106 displays a main notification condition setting window in step S705.

Figure 8:
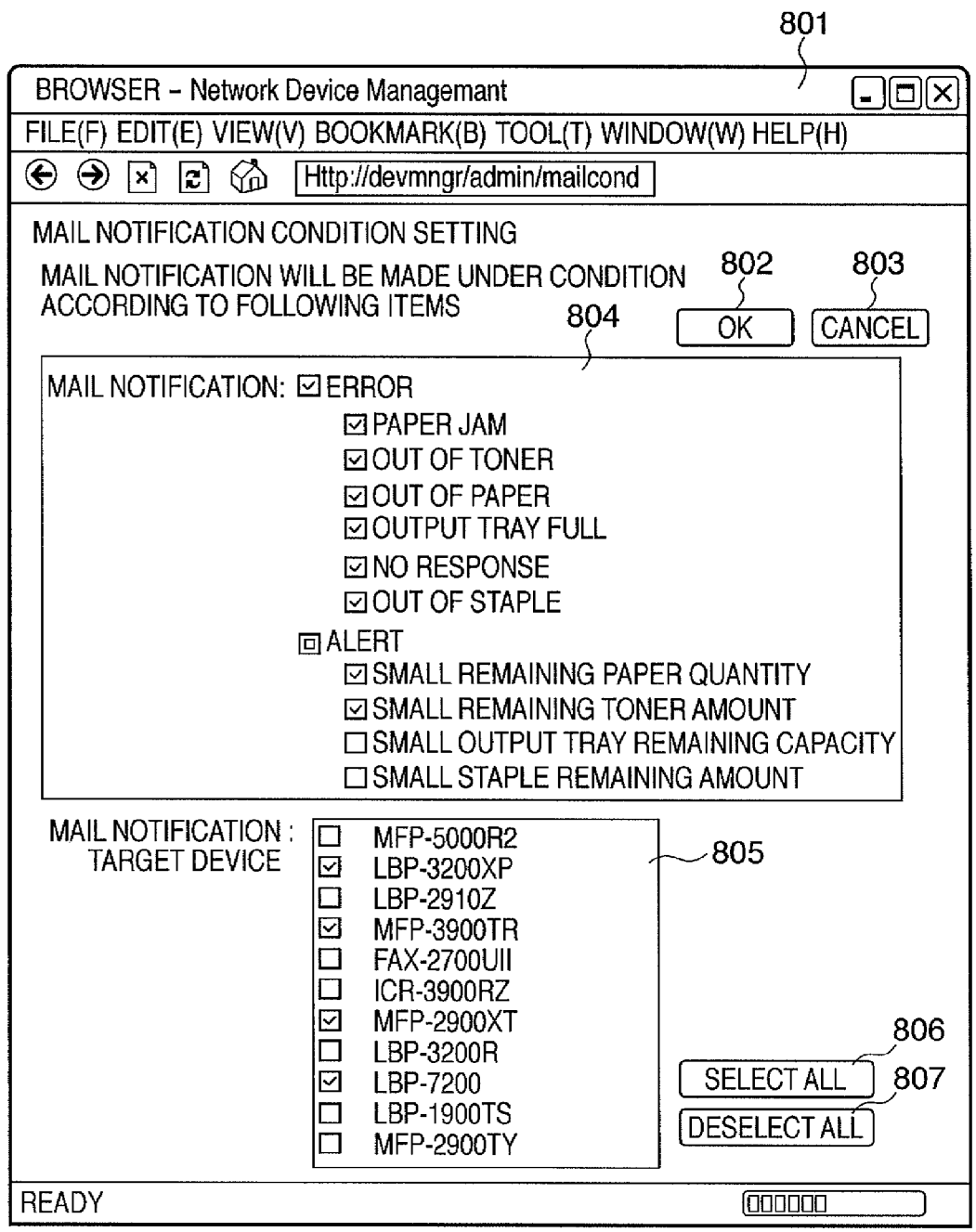
FIG. 8 is a view showing a mail notification condition setting window of the network device management apparatus according to the first embodiment.

FIG. 8 shows an example that illustrates the main notification condition setting window. A window 801 is that of the Web browser 320 which runs on the client PC 304. An OK button 802 is used to transmit values to the management apparatus 106 and to end the processing after the condition is saved when the condition setting is completed. A cancel button 803 is used to abort the condition setting and to return to the previous window.

A selection area 804 includes options to select events to be notified via mail when they occur. This area lists errors, alerts, and the like. When the user selects a check box "error", all events which belong to a category "error", i.e., all check boxes "paper jam", "out of toner", "out of paper", "output tray full", "no response", "out of staple", and the like are selected, and these events are notified via mail. When the user selects a check box "alert", all check boxes which belong to a category "alert" are checked, and these events are selected as targets to be notified. Also, the user can individually select each error event "paper jam" or the like without selecting the check box "error". In this case, an icon indicating that only some events are selected may be displayed within the check box "error" on the window. In FIG. 8, in the category "alert", only "small remaining paper quantity" and "small remaining toner amount" are selected, and an icon indicating that only some events are selected is displayed on the window.

An area 805 is used to select devices, events of which are to be notified via mail. A button 806 is a "select all" button used to simultaneously select all devices displayed on the area 805. A button 807 is a "deselect all" button to deselect selected devices displayed on the area 805.

When the window 801 is displayed on the client PC 304, the administrator appropriately selects displayed notification conditions in step S706 and then presses the OK button to transmit selected items to the management apparatus 106. Upon reception of the selected conditions, the management apparatus 106 records information indicating the selected items and devices (to be referred to as notification target information hereinafter) in the device management information storage unit 311 in step S707. The management apparatus 106 checks in step S708 if the notification target information is normally recorded. If the information is normally recorded, the process advances to step S709. If an error has occurred, the process jumps to step S710.

Figure 9:
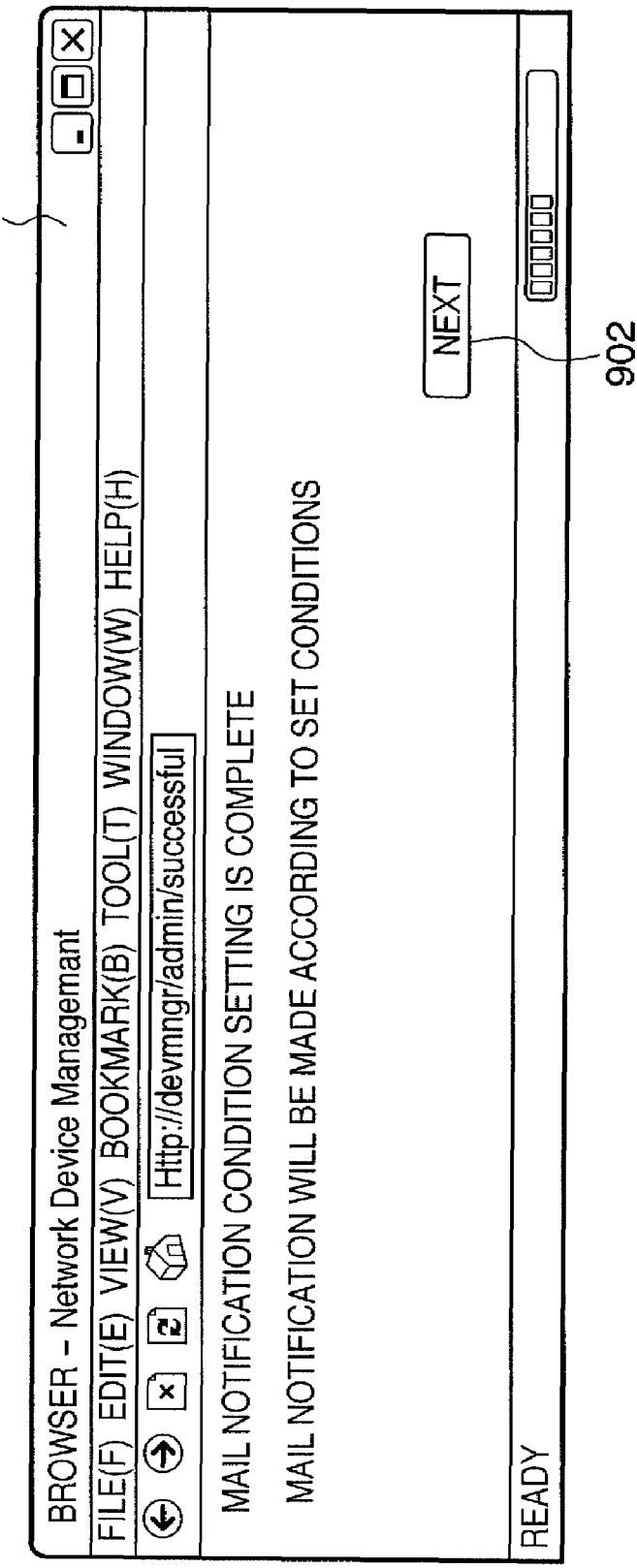
FIG. 9 is a view showing a completion notification window upon normal completion of the mail notification condition setting of the network device management apparatus according to the first embodiment.

In step S709, the management apparatus 106 displays a window indicating that the processing has been normally done. FIG. 9 shows that window. A window 901 is that of the Web browser 320. A button 902 is a "next" button which is pressed by the administrator who confirmed the message so as to advance to the next window.

Figure 10:
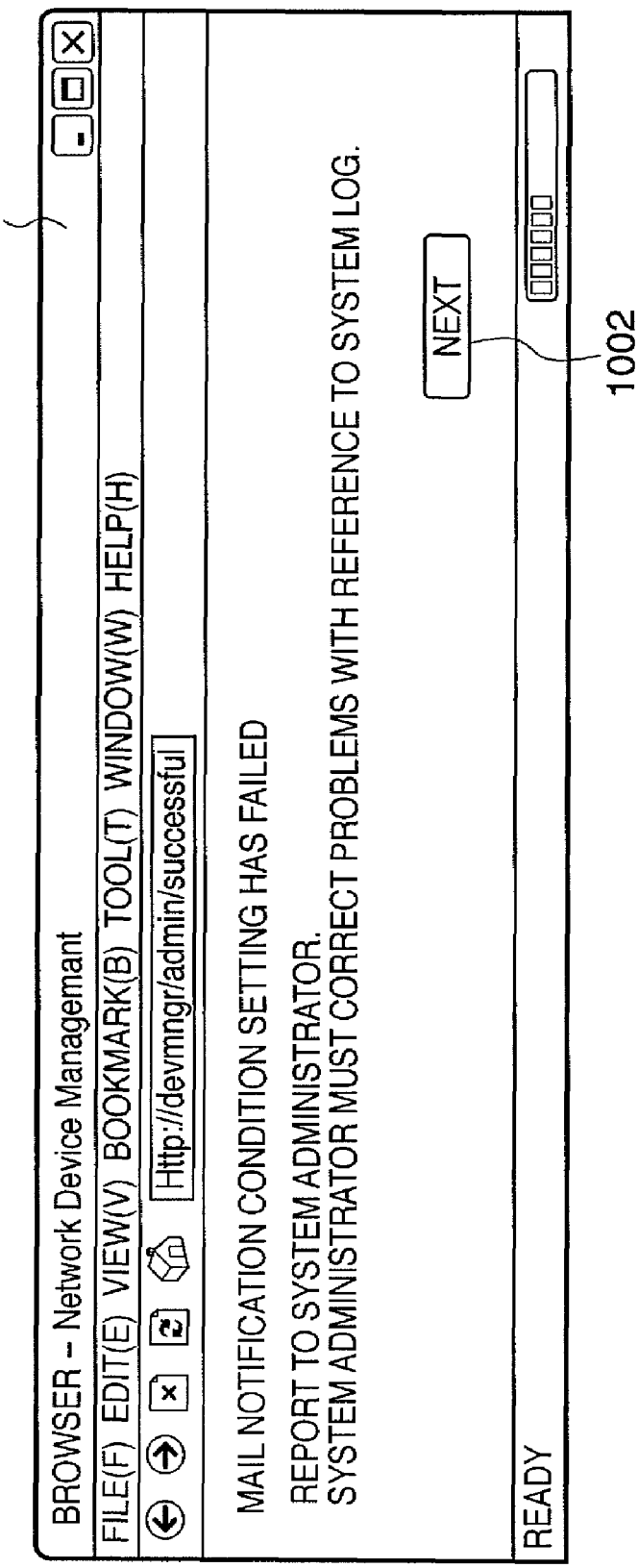
FIG. 10 is a view showing an error notification window upon abnormal termination of the mail notification condition setting of the network device management apparatus according to the first embodiment.

In step S710, the management apparatus 106 displays a window indicating that the processing has not been normally done. FIG. 10 shows such window. A window 1001 is that of the Web browser 320. A button 1002 is a "next" button which is pressed by the administrator who confirmed the message so as to advance to the next window. In either case, the process advances to step S711, and the administrator confirms the window and then presses the "next" button 902 or 1002. Then, the process advances to step S712, thus ending the processing.

<Notification of Status Information Indicating Device Status>

Figure 11:
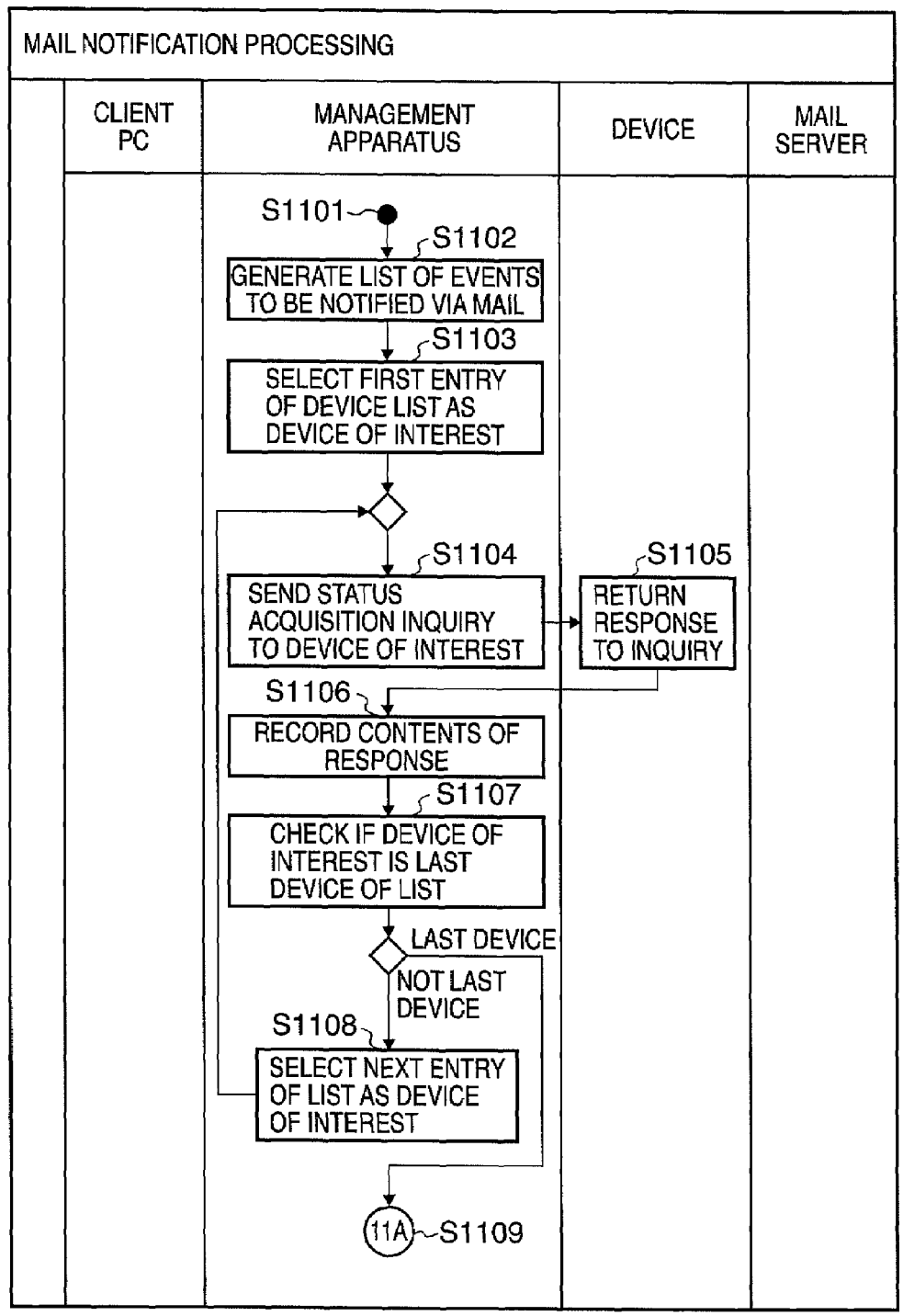
FIG. 11 is a flowchart showing a part of the sequence of the mail notification processing of the network device management apparatus according to the first and second embodiments.
Figure 12:
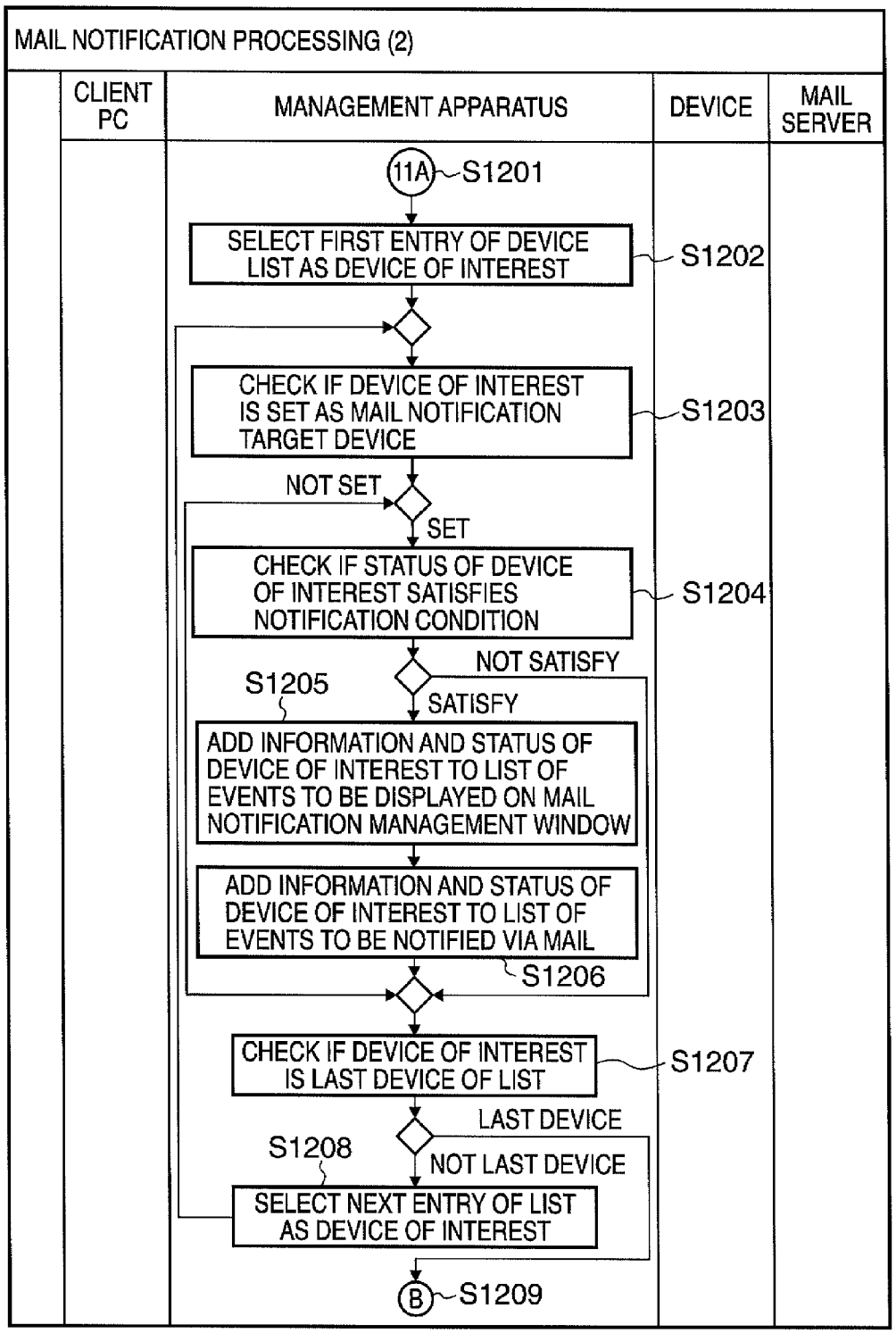
FIG. 12 is a flowchart showing a part of the sequence of the mail notification processing of the network device management apparatus according to the first and second embodiments.
Figure 13:
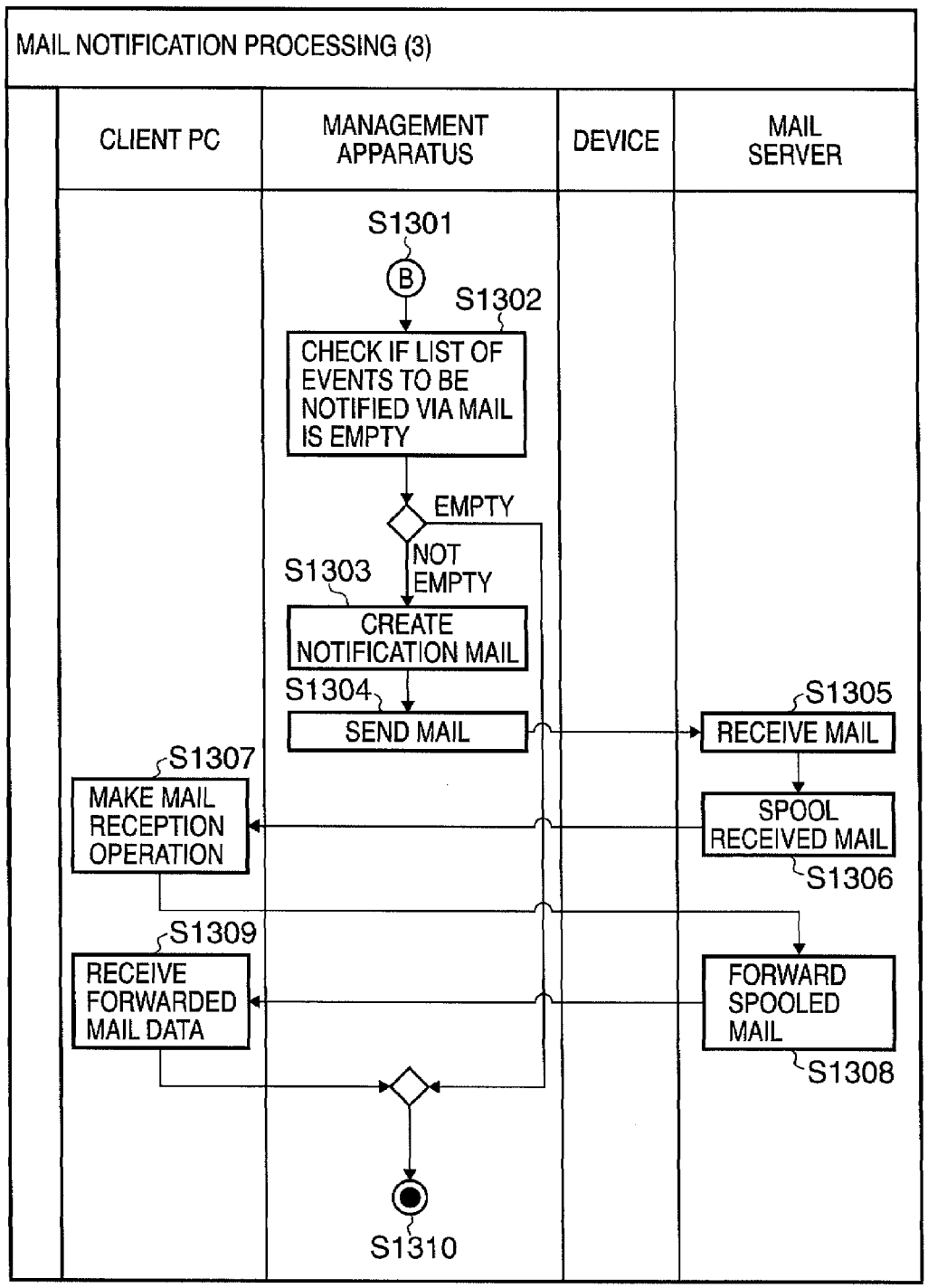
FIG. 13 is a flowchart showing a part of the sequence of the mail notification processing of the network device management apparatus according to the first and second embodiments.

The sequence of the processing when the management apparatus 106 of this embodiment makes mail notification will be described below with reference to FIGS. 11 to 13.

The timer processing unit 315 transmits an interrupt signal when a pre-set time has been reached. Upon reception of the interrupt signal (timer interrupt), the management apparatus 106 launches processing for making mail notification. The apparatus 106 starts mail notification processing from step S1101.

In step S1102, the management apparatus 106 generates a list of events to be notified via mail (to be referred to as a notification event list hereinafter). At this time, the event list is empty. In step S1103, the management apparatus 106 selects the first entry of a list of devices to be managed (to be referred to as a device list hereinafter) managed by itself as a device of interest. In step S1104, the management apparatus 106 sends a status acquisition inquiry to the device 303 of interest. In step S1105, the device 303 responds its own status in response to the inquiry, and the management apparatus 106 receives that status. In step S1106, the management apparatus 106 which received that response records its contents in the device management information storage unit 311 in association with the device. This information will be referred to as a device status table hereinafter. The management apparatus

106 then checks in step S1107 if the current device of interest is the last device of the device list. If the device of interest is the last device, the process jumps to step S1109; otherwise, the process advances to step S1108 to select the next entry of the device list as a device of interest. The process then returns to step S1104 to repeat the processes. In step S1109, status information obtained from the device registered in the device list is registered in the device status table. Steps S1104 and S1105 of receiving a response from the device correspond to an acquisition step of acquiring status information from a registered device. The management apparatus 106 which executes this acquisition step exactly corresponds to an acquisition unit. Step S1106 corresponds to a status information recording step of recording status information. The management apparatus 106 which executes this status information recording step exactly corresponds to a status information recording unit.

In step S1109, the process directly advances to step S1201. In step S1202, the management apparatus 106 selects the first entry of the device list managed by itself as a device of interest again. The management apparatus 106 checks in step S1203 with reference to the notification target information recorded in step S707 if the device of interest is set as a mail notification target device. If the device of interest is set as a target device, the process advances to step S1204; otherwise, the process jumps to step S1207.

The management apparatus 106 checks in step S1204 with reference to the notification target information if the status of the device of interest satisfies the notification condition. If the status satisfies the condition, the process advances to step S1205; otherwise, the process jumps to step S1207. In step S1205, the management apparatus 106 reads out the information and status of the current device of interest from the device status table and adds them to the list of events to be displayed on the mail notification management window generated in step S401.

In step S1206, the management apparatus 106 adds the information and status of the current device of interest to the notification event list generated in step S1102. After that, the process advances to step S1207.

The management apparatus 106 checks in step S1207 if the current device of interest is the last entry of the device list. If the device of interest is the last device, the process jumps to step S1209. If the device of interest is not the last device, the process advances to step S1208. In step S1208, the management apparatus 106 selects the next entry of the device list as a device of interest. The process then returns to step S1203 to continue the processes.

The process directly advances from step S1209 to step S1301. The management apparatus 106 checks in step S1302 if the notification event list generated in step S1102 is empty. If the list is empty, the process jumps to step S1310. If the list is not empty, the process advances to step S1303. In step S1303, the management apparatus 106 creates a notification mail message based on the notification event list. This notification mail message has contents shown in FIG. 14. In step S1304, the management apparatus 106 sends the created notification mail message. The mail sever 302 receives that mail message in step S1305. In step S1306, the mail server 302 spools the mail message, and delivers it to the destination. These steps S1303 and S1304 correspond to a status notification step of notifying, when the status information of a device is acquired, the destination of occurrence of the status. The management apparatus 106 which executes this step corresponds to a status notification unit.

When the e-mail client 321 performs a mail reception operation at the client PC 304, the mail server 302 forwards the spooled mail message to the client in step S1308. The client PC 304 receives the forwarded mail data. Upon completion of reception, the process advances to step S1310. In step S1310, the notification processing ends.

Figure 14:
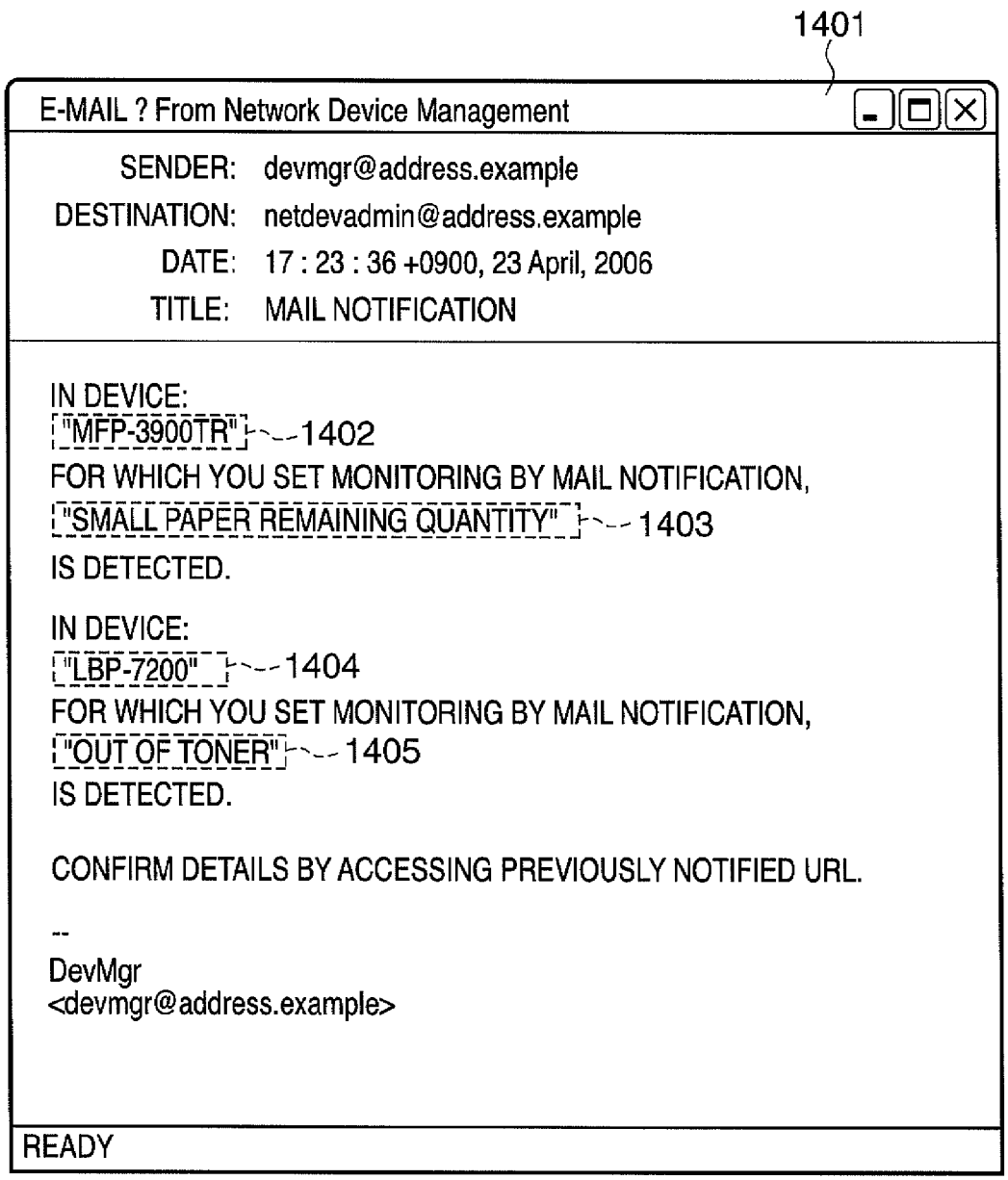
FIG. 14 is a view showing the contents of a notification mail message sent by the mail notification processing of the network device management apparatus according to the first and second embodiments.
Figure 15B:
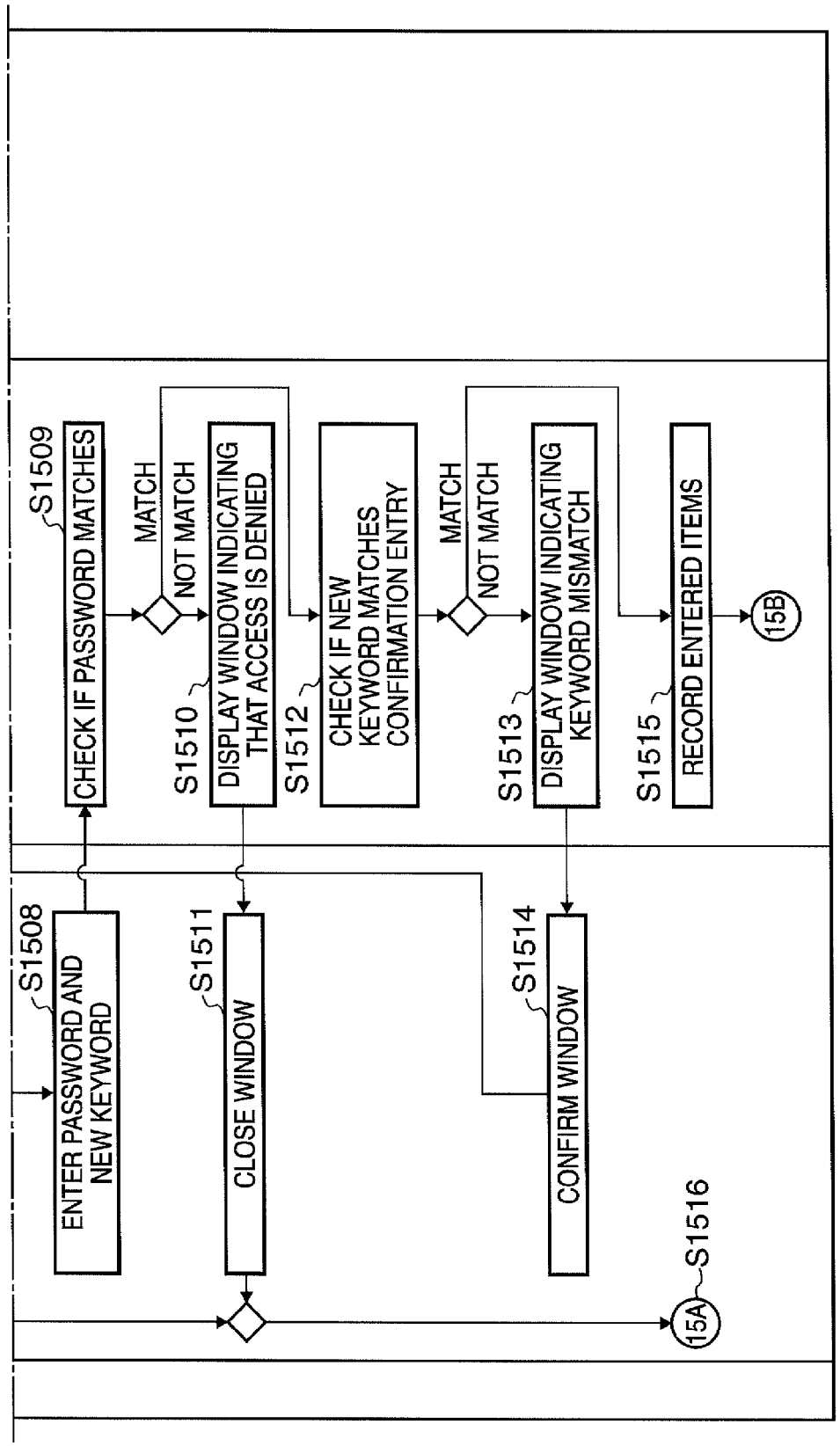

FIG. 14 shows an example of the event notification mail message. A window 1401 is that used by the e-mail client 321 to display the received mail message. Of information embedded in the window 1401, a device name 1402 is that of a device in which the first one of the detected mail notification target events has occurred. A status 1403 is that of the device in which the first one of the mail notification target events has occurred. A device name 1404 is that of a device in which the second one of the detected mail notification target events has occurred. A status 1405 is that of the device in which the second one of the mail notification target events has occurred.

This notification mail message 1401 does not include any URL used to manipulate a device. Upon reading this mail message, the administrator refers to the URL notification mail message (FIG. 6) received when he or she made the administrator registration for the first time. The administrator can browse the mail notification management window by accessing the URL 603 described in the mail body text of the URL notification mail message. On the mail notification management window, the administrator can change a password and keyword.

As described above, when a pre-registered device has a pre-registered status, the administrator is notified of that status.

<Maintenance of Notification Keyword, etc.>

The sequence of the processing executed when the management apparatus 106 of this embodiment displays the mail notification management window for the purpose of maintenance of a notification keyword and the like will be described below with reference to FIGS. 15A to 16B.

Figure 17:
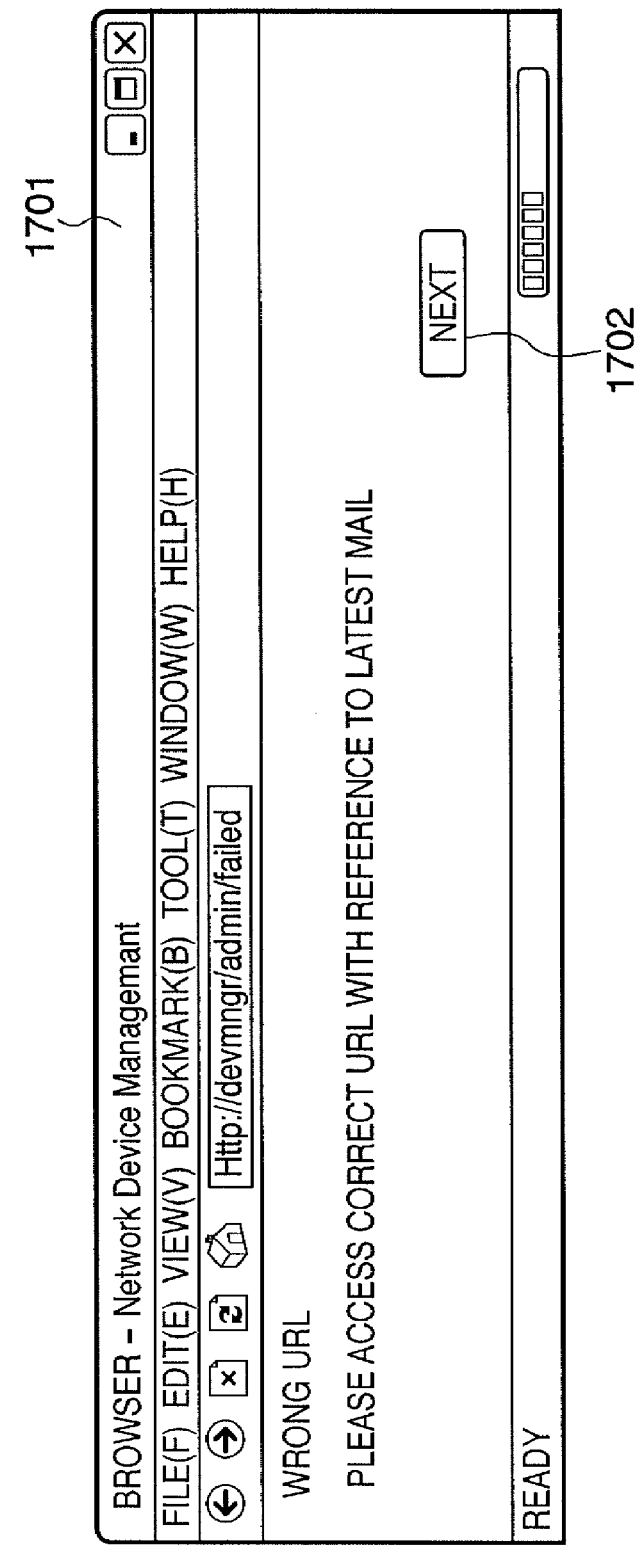
FIG. 17 is a view showing an error notification window indicating an access to a wrong address of the network device management apparatus according to the first and second embodiments.

The processing starts from step S1501. In step S1502, the administrator designates the URL 603 included in the URL notification mail message (FIG. 6) on the Web browser 320, and attempts to access the management apparatus 106. If the e-mail client supports a hyperlink, the administrator clicks on the URL 603 included in the URL notification mail message to launch the Web browser, which accesses that URL. In response to this access, the management apparatus 106 checks in step S1503 if the accessed URL is registered as that of an effective mail notification management window. If that URL is not registered, the process advances to step S1504, and the management apparatus 106 displays a window indicating that that access is denied. FIG. 17 shows an example of such window. A window 1701 is that of the Web browser 320. A button 172 is a "next" button which is pressed by the administrator who confirmed the message so as to advance to the next window.

If the administrator confirms this window in step S1505, the process jumps to step S1516.

As a result of checking in step S1503, if the URL is registered, the process advances to step S1506. In step S1506, the management apparatus 106 displays a mail notification management window corresponding to the registered URL. Steps S1503 to S1506 correspond to an information providing step of providing status information saved in the storage unit to an accessing party. The management apparatus which executes this step corresponds to an information providing unit.

FIG. 18 shows an example of this mail notification management window. A window 1801 is that of the Web browser 320. A password entry field 1802 is used by the administrator to enter the password, and an echo back is made using symbols "*" without displaying the entered value itself. A keyword entry field 1803 is used to enter a mail notification keyword to set a new mail notification keyword for the next time. A confirmation entry field 1804 is used to re-enter the keyword so as to confirm if the keyword entered in the keyword entry field 1803 is wrong. In both the keyword entry field 1803 and confirmation entry field 1804, echo backs are made using symbols "*" without displaying actually entered values themselves. An OK button 1805 is used to transmit and settle the password and keyword to the management apparatus 106 upon completion of the password entry and keyword entry. A cancel button 1806 is used to cancel entries. An event view 1807 is a view of events notified by mail notifications after the keyword was previously determined to date (step S1503 which is being executed). The event view 1807 includes events recorded in step S1205 in the event list to be displayed on the mail notification management window generated in step S410.

Figure 19:
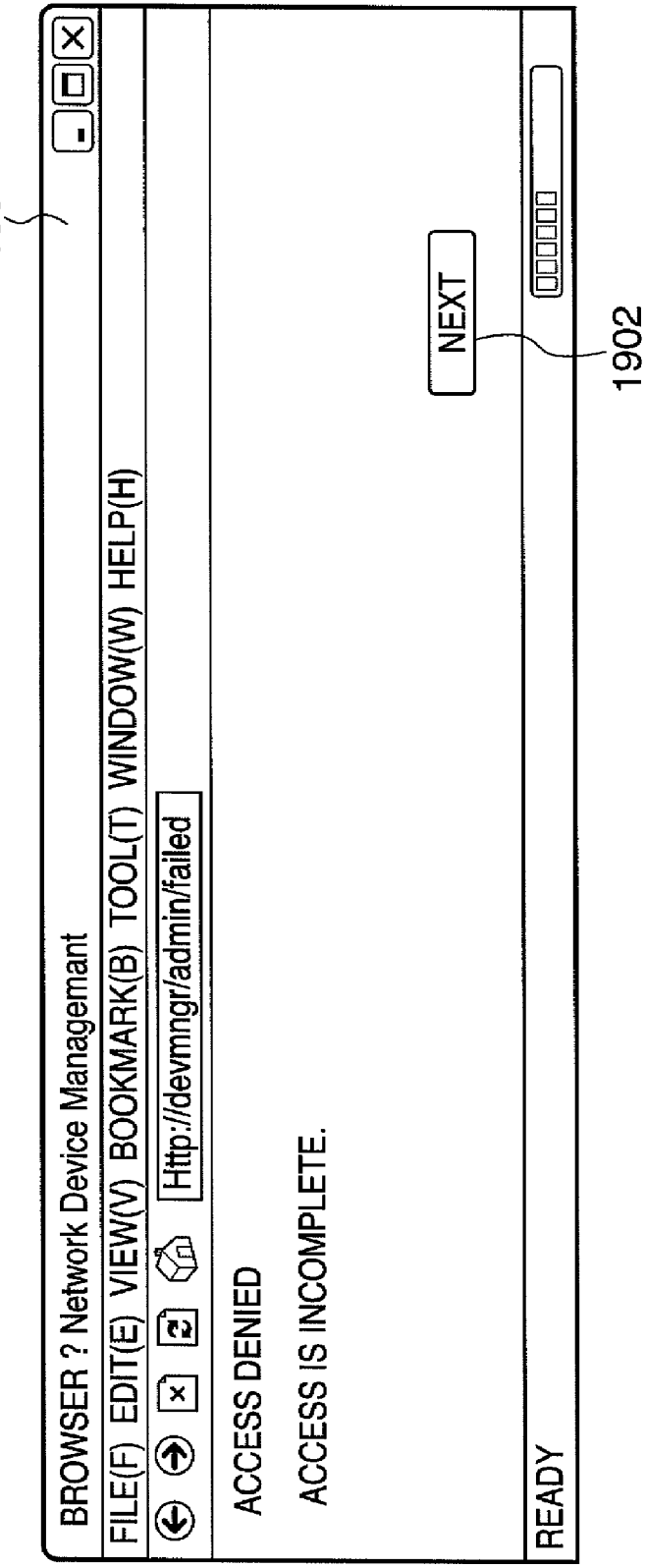
FIG. 19 is a view showing an error notification window to the entry of a wrong password of the network device management apparatus according to the first and second embodiments.

After the window 1801 is displayed, the administrator checks the event view (to be also referred to as an event list hereinafter) 1807 and decides in step S1507 if he or she executes more management operations. As the management operations, assume that the administrator stops the print function of the device to be managed, and makes management such as confirmation of stocks of paper sheets and toners, order placement, and the like. These operations can be executed by only the administrator. If the administrator decides that he or she executes the management operations, the process advances to step S1508. In step S1508, the administrator enters the password to the password entry field 1802, correctly enters a new keyword to the keyword entry fields 1803 and 1804, and then presses the OK button 1805. The input data are transmitted to the management apparatus 106. The management apparatus 106 checks in step S1509 if the password entered in the password entry field 1802 matches that which was entered on the administrator registration window (FIG. 5) and was recorded in step S407. If the two passwords do not match, the process advances to step S1510, and the management apparatus 106 displays a window indicating that the access is denied. FIG. 19 shows an example of such window. A window 1901 is that of the Web browser 320. A button 1902 is a "next" button which is pressed by the administrator who confirmed the message so as to advance to the next window.

If the administrator closes this window in step S1511, the process advances to step S1516.

Figure 20:
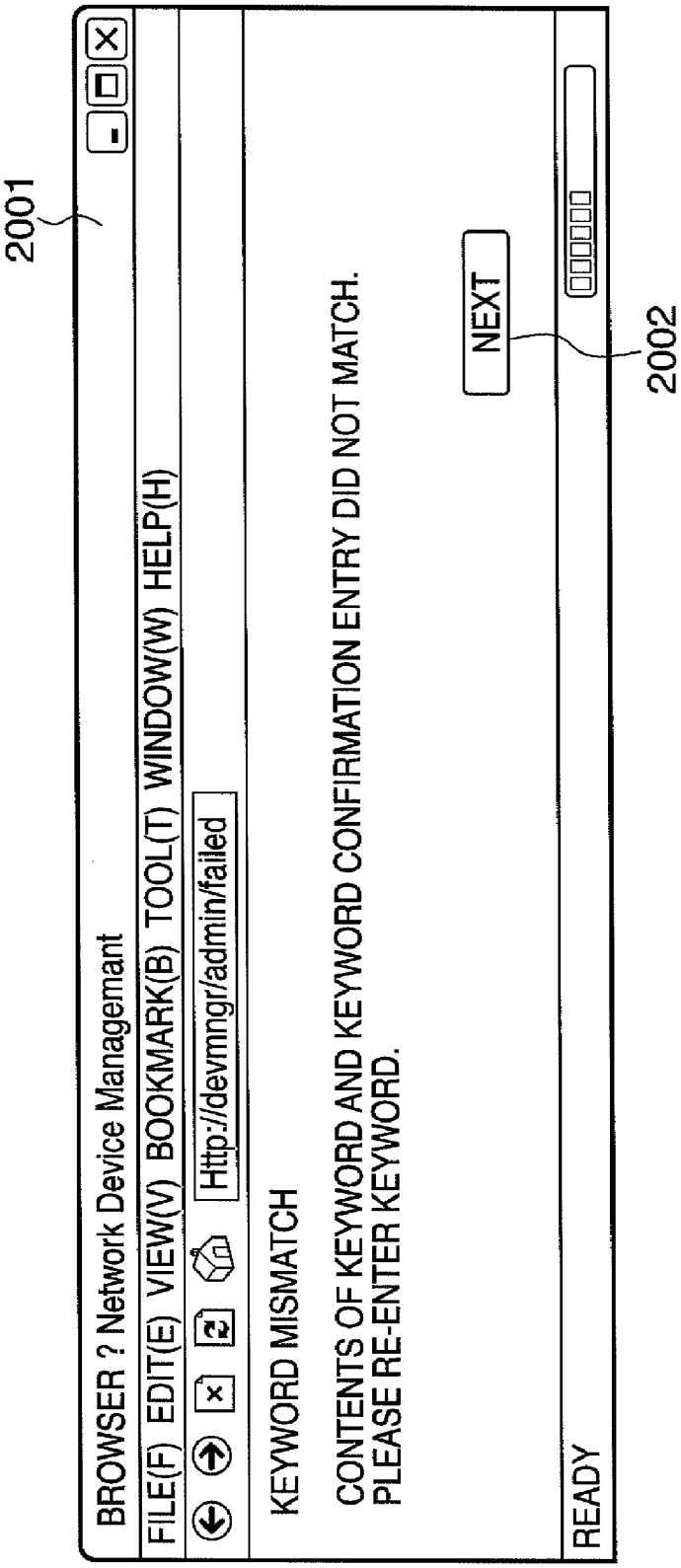
FIG. 20 is a view showing an error notification window indicating a keyword mismatch of the network device management apparatus according to the first and second embodiments.

As a result of checking in step S1509, if the input password matches the registered password, the process jumps to step S1512. The management apparatus 106 checks in step S1512 if the entry contents of the keyword entry field 1803 and keyword confirmation entry field 1804 match. If they do not match, the process advances to step S1513, and the management apparatus 106 displays a window indicating that the two keywords do not match. FIG. 20 shows an example of such window. A window 2001 is that of the Web browser 320. A button 2002 is a "next" button which is pressed by the administrator who confirmed the message so as to advance to the next window.

After the administrator confirms the window indicating a mismatch of the keywords in step S1514, the process returns to step S1506 to continue the processes. If it is determined in step S1512 that the keyword matches the confirmation entry of the keyword, the process advances to step S1515 to record the entry item, i.e., a new keyword. After that, the process advances to step S1601. Step S1515 corresponds to an update step of updating the password and/or the keyword required to access the storage unit in response to an update request. In this embodiment, both the password and keyword are updated, but either of them may be updated. The management apparatus 106 which executes step S1515 corresponds to an update unit.

The process advances from step S1601 to step S1602. In step S1602, the management apparatus 106 generates a URL for a new mail notification management window. In step S1603, the management apparatus 106 generates a list of events to be displayed on the mail notification management window generated in the previous step. In step S1604, the management apparatus 106 creates a mail message which describes the new keyword entered in step S1508 and the URL generated in step S1602. In step S1605, the management apparatus 106 sends the mail message to the mail address which was entered by the administrator on the administrator registration window (FIG. 5) and was recorded in step S407.

In step S1606, the mail server 302 accepts the mail message sent in step S1605, and delivers it to its destination. After the mail server 302 accepts the mail message, the process advances to step S1607, and the management apparatus 106 displays a window used to make management operation associated with events notified via mail.

FIG. 21 shows such window. A window 2101 is that of the Web browser 321. A mode 2102 is an indication indicating that this window is in the administrator mode. A view 2103 is that which records events that are the same as those on the event view 1807 and have occurred after the previous keyword was set. Each button 2104 is a setting button used to make a setting for a device described in that row. When the administrator presses the setting button 2104, he or she can switch from this window to a device-dependent management window, and can execute management operations for that device.

After the window required to make the management operations is displayed, the administrator executes necessary management operations at the client PC 304. On the other hand, the management apparatus 106 deregisters the URL of the old mail notification management window generated in step S409. Upon completion of the respective processes, the process advances to step S1615.

After the mail message is accepted in step S1606, the process parallelly advances to step S1610. In step S1610, the mail server 302 spools the accepted mail message and delivers it to its destination. After that, the e-mail client 321 which runs on the client PC 304 performs a mail reception operation in step S1611. In step S1612, the mail server 302 forwards the spooled mail message. In step S1613, the mail client 321 receives the forwarded mail data. Upon completion of reception, the process advances to step S1615.

The process directly advances from step S1516 to step S1614. The process directly advances from step S1614 to step S1615. In step S1615, the processing ends.

<Overview of Processing>

FIGS. 22A and 22B are simplified diagrams of the sequence of the overall processing of the management apparatus 106 of this embodiment, which is simplified and schematized, and the following description will be given using these figures. In FIGS. 22A and 22B, "administrator" on the leftmost end indicates operations by the administrator. All of "mail notification management window 1", "mail notification management window 2", and "mail notification management window 3" on the right side are windows displayed on the client PC, and are executed by the Web browser of the client PC.

In step S2201, the administrator on the client PC 304 executes administrator registration for the management apparatus 106. The management apparatus 106 accepts a mail notification setting and keyword registration made by the administrator in step S2202 in this case. Then, the management apparatus 106 generates a URL for mail notification management window 1 in step S2203. Also, the management apparatus 106 generates a list of events to be displayed on this mail notification management window 1 in step S2204. After that, the management apparatus 106 notifies the administrator of the keyword and the generated URL via mail in step S2205. The administrator himself or herself and the management apparatus 106 only know the keyword set in step S2202. For this reason, the administrator can recognize that the e-mail message received in step S2205 is that which is sent from the management apparatus 106 if the keyword described in that mail message is correct. In this way, phishing made by guiding a user to a disguised Web page by a URL embedded in e-mail can be prevented.

In step S2206, an event to be notified by mail occurs. The management apparatus 106 which detects this event adds, in step S2207, it to the event list generated in step S2204, and notifies the client of this event via mail in step S2208. Subsequently, processing is also generated in a combination of occurrence of an event, addition to the list, and mail notification. Upon occurrence of an event in step S2209, the management apparatus 106 adds it to the list in step S2210, and notifies the administrator of occurrence of the event via mail in step S2211.

In step S2212, the client PC accesses the URL described in the mail message received in step S2208 in accordance with an instruction of the administrator. In step S2213, the management apparatus 106 displays mail notification management window 1. In step S2214, the administrator enters the password and sets a new keyword on mail notification management window 1 to execute the management operation. At this time, the management apparatus 106 generates a URL of new mail notification management window 2 in step S2215, and generates a new list in step S2216. In step S2217, the management apparatus 106 notifies the administrator of the new keyword and newly generated URL via mail. After that, mail notification management window 1 disappears in step S2218.

The management apparatus 106 reports all events which occur after this process on mail notification management window 2. The management apparatus 106 adds, in step S2220, an event which has occurred in step S2219 to the list generated in step S2216, and notifies the administrator of occurrence of that event via mail in step S2221. The process progresses similarly. That is, the management apparatus 106 adds, in step S2223, an event which has occurred in step S2222, to the list in step S2223, and notifies the administrator of occurrence of the event via mail in step S2224. If the client accesses the notified URL in step S2217 in accordance with an instruction of the administrator, the management apparatus 106 displays mail notification management window 2 in step S2226. If the administrator sets a new keyword in step S2227, the management apparatus 106 generates new mail notification management window 3 again, and generates a URL in step S2228. In step S2229, the management apparatus 106 generates a list of events to be displayed on mail notification management window 3. In step S2230, the management apparatus 106 sends an e-mail message that describes the keyword input in step S2227 and the URL generated in step S2228 to the administrator. After that, mail notification management window 2 disappears in step S2231.

In this way, using this embodiment, a mail message which is received by the administrator and describes a URL describes a keyword that the administrator himself or herself entered to the management apparatus. For this reason, the URL is free from disguise. Even when an ill-intentioned user intends to guide the administrator to another server by pharming, the URL is changed to a random one every time the keyword is set, and it is difficult to prepare a corresponding server. Even when such user is successful in imitation of a window to be accessed by the URL, the user name of the administrator is not entered there and the password alone is entered. For this reason, damage can be minimized. Even when the administrator logs in the window, if a mail message that describes the keyword is not sent, he or she can know that a security problem has occurred.

In this manner, using this embodiment, the security on the Intranet can be enhanced.

[Modification]

Note that the randomly generated URL in this embodiment corresponds to a part of a directory (or folder) appended to the domain name. This directory indicates that where a Web page is saved or a CGI program to be executed is saved. In this embodiment, this directory part is randomly generated, and a directory name which does not exist in practice is used like a password. However, when a general-purpose Web server is used, a Web page designated by a URL including a directory part is read out and provided to the client. Hence, when a new URL is generated, a directory corresponding to the URL is generated, or the existing directory name is changed to a name corresponding to that URL. In that directory, the Web page including the event view 1807 (see FIG. 18) is generated and saved. In this way, the general-purpose Web server can provide a Web page saved at the randomly generated URL.

Second Embodiment

The second embodiment of the present invention will be described hereinafter with reference to the accompanying drawings. The arrangement of a network to which a network device management apparatus of this embodiment is connected is the same as that shown in FIG. 1. Also, the block diagram showing the internal arrangement of the server apparatus 106 and the client PCs 102 and 103 is the same as that shown in FIG. 2. Furthermore, the configuration of the software modules of the network management apparatus and the related PC, server, and device is basically the same as that shown in FIG. 3.

Figure 23A:
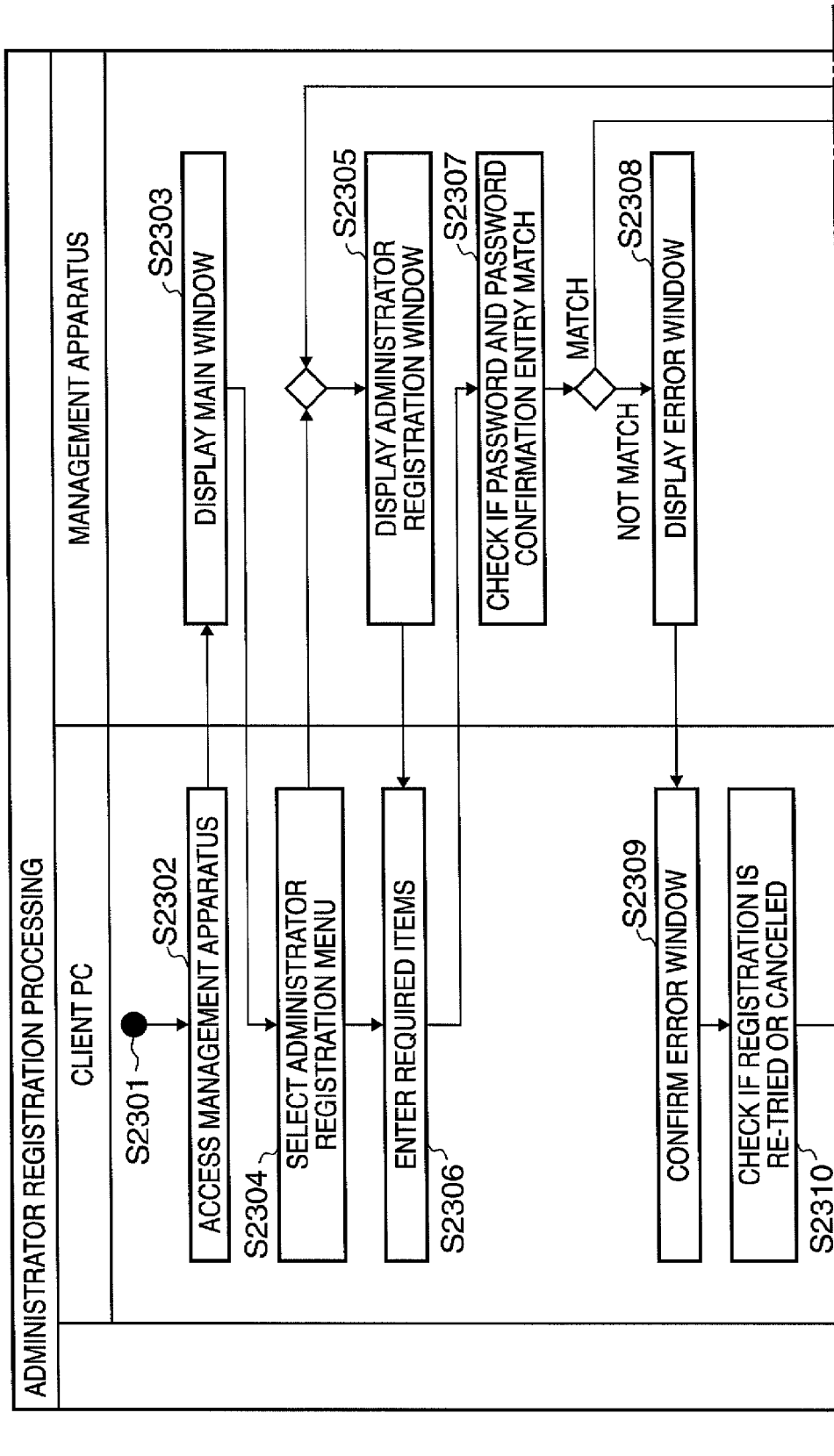
FIGS. 23A and 23B are flowcharts showing the sequence of the administrator registration processing in the network device management apparatus according to the second embodiment.
Figure 23B:
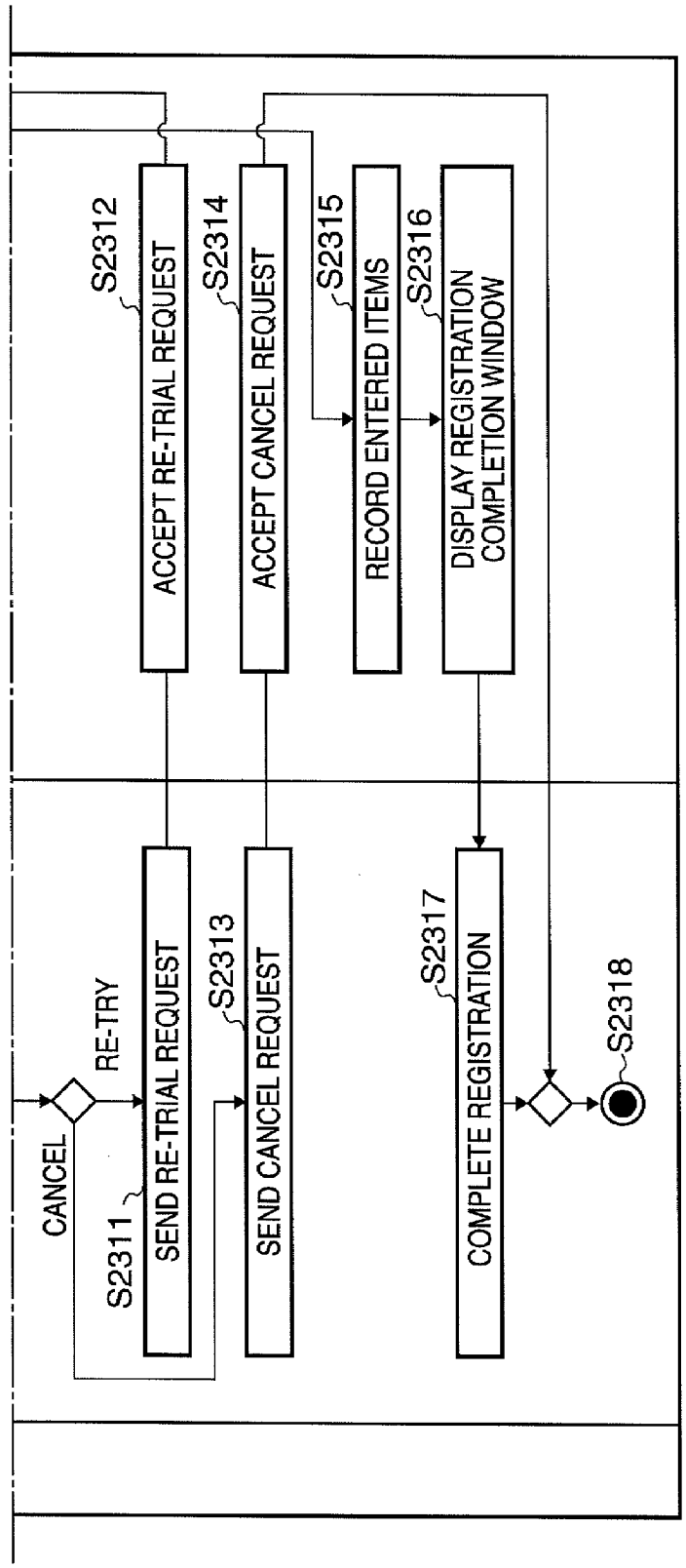

The sequence executed when the user executes administrator registration in the management apparatus of this embodiment will be described below with reference to FIGS. 23A and 23B. The processing starts from step S2301. In step S2302, the client PC 304 accesses the management apparatus 106 in accordance with a user's instruction. In step S2303, the management apparatus 106 displays a main window. In step S2304, the client PC accepts an entry to the administrator registration menu by the user. In step S2305, the management apparatus 106 then displays an administrator registration window.

FIG. 24 shows such administrator registration window. A window 2401 is that of the Web browser 320 which runs on the client PC 304. A button 2402 is an OK button used to settle information after the information for the administrator registration is entered, and to complete the administrator registration. A button 2403 is a cancel button used to abort entries and to cancel the administrator registration. A text entry field 2404 is used to enter a login name. A text entry field 2405 is used to enter the last name of the name of the administrator. A text entry field 2406 is used to enter the first name of the name of the administrator. A text entry field 2407 is used to enter a password. An echo back of the value for the password entry field is made using symbols "*" without displaying the entered value itself. A text entry field 2408 is a password confirmation entry field used to re-enter the password so as to confirm if the user can accurately enter the password. An echo back of this field is also made using symbols without displaying the entered value.

After the user enters required items in step S2306, the process advances to step S2307. The management apparatus 106 checks in step S2307 if the password entered in the password entry field 2407 matches that entered in the password confirmation entry field 2408. If the two passwords do not match, the process advances to step S2308 to display an error window.

Figure 25:
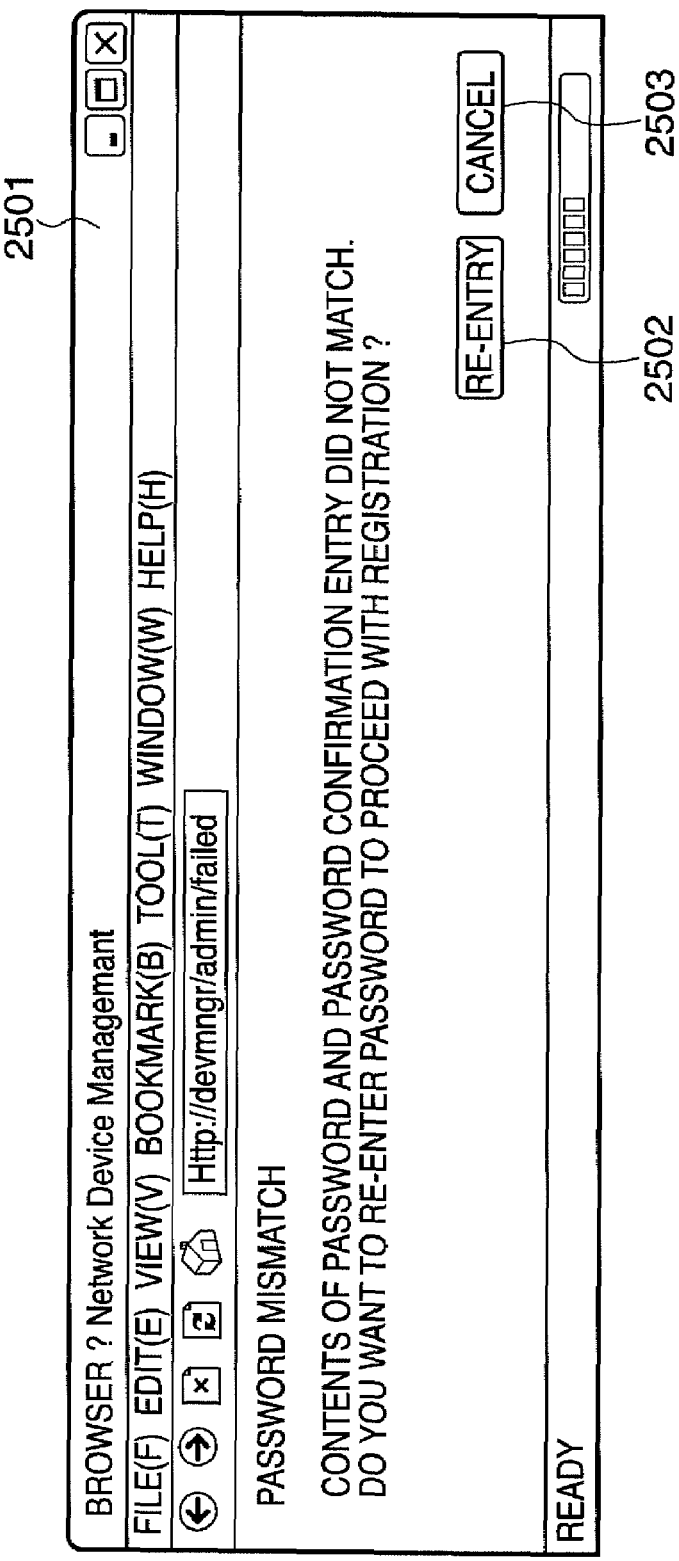
FIG. 25 is a view showing an error notification window indicating a password mismatch of the network device management apparatus according to the second embodiment.

FIG. 25 shows an example of such error window. A window 2501 is that of the Web browser 320. A button 2502 is a "re-entry" button used to re-enter the password by the user who confirmed the message and to proceed with the administrator registration. A button 2503 is a "cancel" button used to cancel the administrator registration.

In step S2309, the user confirms the error window. The user decides in step S2310 if he or she re-tries or cancels registration. In order to re-try the registration, the process advances to step S2311, and the user presses the "re-entry" button 2502 displayed on the window of the client. This information is transmitted to the management apparatus 106. If the management apparatus 106 accepts a re-trail request in step S2312, the process returns to step S2305 to continue the processes.

If the user cancels the administrator registration, the process jumps to step 2313, and the user presses the "cancel" button 2503. This information is transmitted to the management apparatus 106. If the management apparatus 106 accepts a cancel request in step S2314, the process advances to step S2318.

If the password entry matches the password confirmation entry in step S2307, the process jumps to step S2315. In step S2315, the management apparatus 106 records respective entry items in the device management information storage unit 311. The process then advances to step S2316, and the management apparatus 106 displays a registration completion window.

FIG. 26 shows the registration completion window. A window 2601 is that of the Web browser 320. A button 2602 is a "next" button which is pressed by the administrator who confirmed the message to switch to the next window. If the user presses the "next button 2602 to complete registration in step S2317, the process advances to step S2318. In step S2318, the processing ends.

Figure 27A:
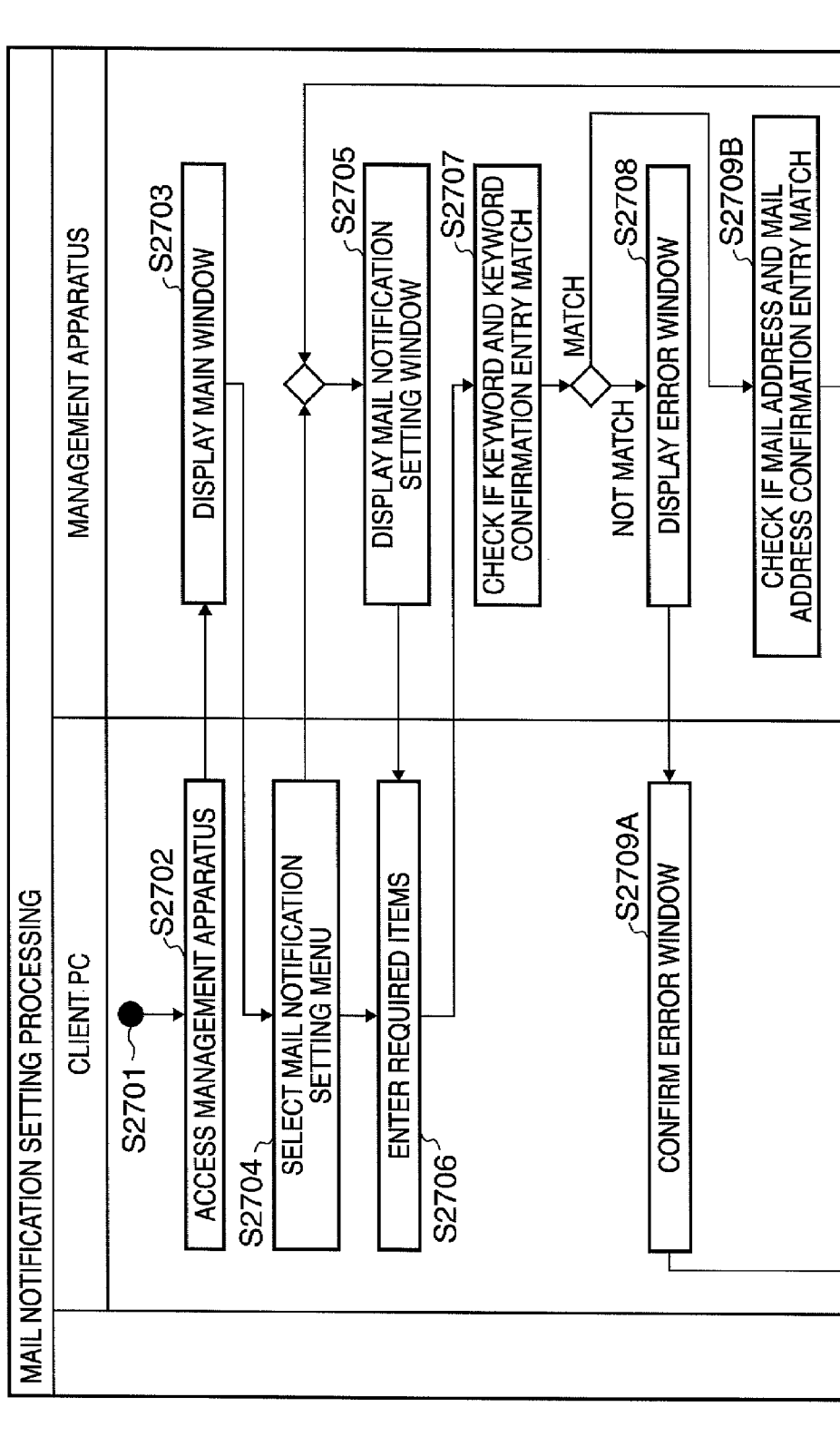
FIGS. 27A and 27B are flowcharts showing the sequence of the mail notification condition setting processing of the network device management apparatus according to the second embodiment.
Figure 27B:
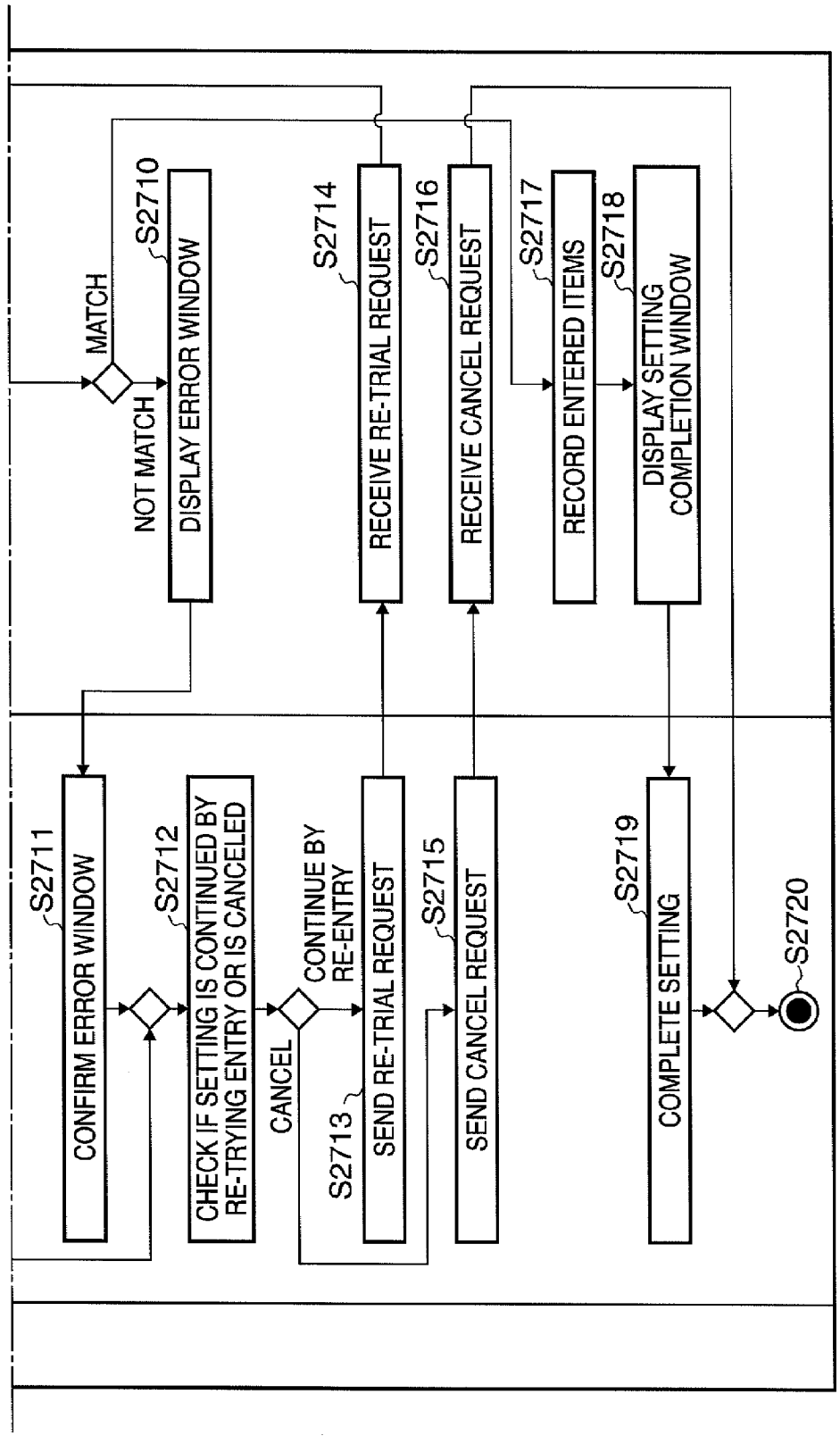

The sequence executed when the administrator makes a mail notification setting in this embodiment will be described below with reference to FIGS. 27A and 27B. The process starts from step S2701. In step S2702, the administrator accesses a predetermined URL from the Web browser 320 of the client PC 304. That URL indicates a Web page provided by the management apparatus 106. The management apparatus 106 displays a main window in step S2703. In step S2704, the administrator selects a mail notification setting menu. In step S2705, the management apparatus 106 displays a mail notification setting window.

FIG. 28 shows an example of such mail notification setting window. A window 2801 is that of the Web browser. A mode 2802 is an indication indicating an administrator mode. A text entry field 2803 is used to enter a keyword used for mail notification. An echo back of this entry field is made using symbols "*" or the like without displaying the entered value. A text entry field 2804 is used for a keyword confirmation entry so as to confirm if the administrator can accurately enter a keyword. A text entry field 2805 is used to enter a mail address as a destination of mail notification. A text entry field 2806 is used for a mail address confirmation entry so as to confirm if the administrator accurately enters the mail address. A button 2807 is an OK button used to settle information after the administrator enters the information for the mail notification setting and to complete the mail notification setting. A button 2808 is a cancel button used to abort entries and to cancel the mail notification setting. An area 2809 includes a check box group used to set mail notification conditions. When the administrator clicks and select a check box of an item indicating the overall category "error", items such as "paper jam", "out of toner", "out of paper", "output tray full", "no response", and "out of staple" are simultaneously checked. If at least one item is unchecked, an item indicating the overall category is set in a "partially checked" state, as indicated by a check box "alert" in FIG. 28. If all the items which belong to a given category are unchecked, the item of that category is also unchecked. When the item of a given category in the "partially checked" state is clicked, all the items of that category are checked; when it is clicked while all the items are checked, all the items are unchecked. A list 2810 is used to select devices as notification targets. A button 2811 is a "select all" button used to select all displayed devices, and a button 2812 is a "deselect all" button used to clear selection of all the devices.

Upon completion of the entry in step S2706, if the administrator presses the OK button 2802, the client PC transmits the entered information to the management apparatus 106. The management apparatus 106 checks in step S2707 if the contents of the keyword field 2804 of the entered information matches those of the keyword confirmation entry field 2805. If these contents do not match, the process advances to step S2708 to display an error window.

FIG. 29 shows such error window. A window 2901 is that of the Web browser 320 of the client PC 304. A button 2902 is a "re-entry" button used to re-enter the keyword and to proceed with the setting. A button 2903 is a "cancel" button used to cancel the setting operations.

In step S2709A, the administrator confirms the error window. After confirmation, the administrator presses either of the buttons. As a result, the process jumps to step S2712.

On the other hand, if the keyword and keyword confirmation entry values match in step S2707, the process advances to step S2709B to check if the mail address value matches the mail address confirmation entry value. If they do not match, the process advances to step S2710 to display an error window.

Figure 30:
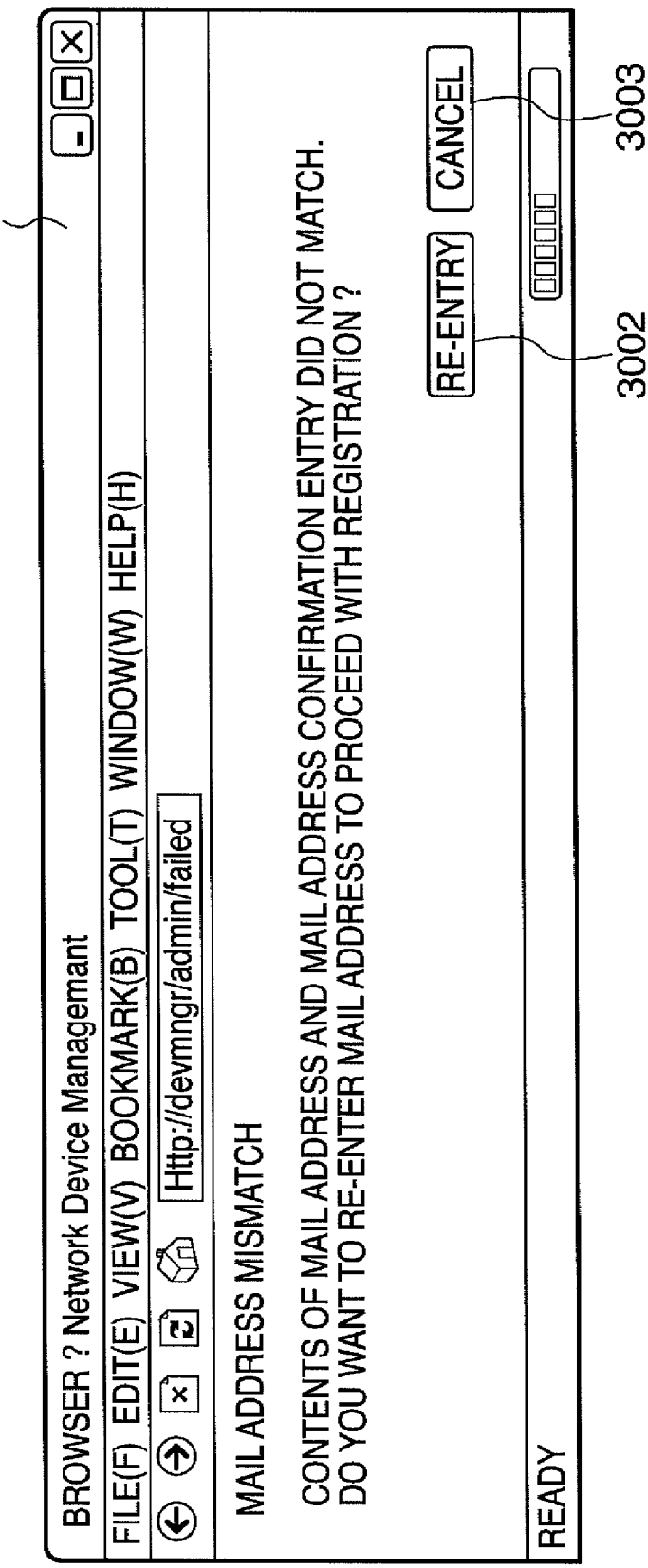
FIG. 30 is a view showing an error notification window indicating a mail address mismatch of the network device management apparatus according to the second embodiment.

FIG. 30 shows such error window. A window 3001 is that of the Web browser 320 of the client PC 304. A button 3002 is a "re-entry" button used to re-enter the mail address and to proceed with the setting. A button 3003 is a "cancel" button used to cancel the setting operations.

In step S2711, the administrator confirms the error window. If the administrator presses either of the buttons, the process advances to step S2712. The client PC checks in step S2712 if the administrator presses the "re-entry" button 2902 or 3002 to re-enter the keyword or mail address and to select continuation of the setting, or presses the cancel button. If the administrator re-enters the keyword or mail address to proceed with the setting, the process advances to step S2713 to transmit a re-trial request. The process advances to step S2714, and the management apparatus 106 receives the re-trial request. The process then returns to step S2705 to continue the processes.

If the administrator cancels the setting, the process jumps to step S2715 to transmit a cancel request. If the management apparatus 106 receives the cancel request in step S2716, the process directly jumps to step S2720.

If the mail address and mail address confirmation entry values match in step S2709, the process advances to step S2717, and the management apparatus 106 records the entered values in the device management information storage unit 311. The process then advances to step S2718, and the management apparatus 106 displays a registration completion window. The registration completion window displayed in this step is the same as that shown in FIG. 9. If the administrator confirms the window and completes the setting in step S2719, the process advances to step S2720. In step S2720, the processing ends.

In this embodiment, the sequence of the processing executed when the management apparatus 106 makes a mail notification is the same as that described using FIGS. 1 to 13. A notification mail message to be created in step S1303 is the same as that shown in FIG. 14. The sequence of the processing executed when the management apparatus 106 of this embodiment displays a mail notification management window is the same as that shown in FIGS. 15A to 16B. The window which is displayed by the management apparatus 106 in step S1510 to deny accesses is the same as that shown in FIG. 19. The window which is displayed by the management apparatus 106 in step S1513 to indicate a keyword mismatch is the same as that shown in FIG. 20. The window which is displayed by the management apparatus 106 in step S1607 and is sued to make management operations associated with events notified via mail is the same as that shown in FIG. 21. Note that the sequence of the overall processing of the management apparatus 106 of this embodiment can be similarly explained using the simplified and schematized diagrams shown in FIGS. 22A and 22B.

In this way, using this embodiment, a mail message which is received by the administrator and describes a URL describes a keyword that the administrator himself or herself entered to the management apparatus, as in the first embodiment. For this reason, the URL is free from disguise. Even when an ill-intentioned user intends to guide the administrator to another server by pharming, the URL is changed to a random one every time the keyword is set, and it is difficult to prepare a corresponding server. Even when such user is successful in imitation of a window to be accessed by the URL, the user name of the administrator is not entered there and the password alone is entered. For this reason, damage can be minimized. Even when the administrator logs in the window, if a mail message that describes the keyword is not sent, he or she can know that a security problem has occurred. In this manner, using this embodiment, the security on the Intranet can be enhanced.

Against another fraudulent means called pharming, the system of this embodiment can provide an indirect defense as described above unless a hacker knows an URL including an accurate path.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like). The objects of the present invention are also achieved by supplying a storage medium, which records a program code of a software program that can implement the aforementioned functions to the system, and reading out and executing the program code stored in the storage medium by the system. In this case, the program code itself read out from the storage medium implements the functions of the aforementioned embodiments, and the storage medium which stores the program code constitutes the present invention.

Also, the present invention includes a case wherein an operating system (OS) running on a computer executes some or all of actual processing operations based on an instruction of the program code to implement the aforementioned functions. Furthermore, the present invention also includes a case wherein the program code read out from the storage medium is written in a memory equipped on a function expansion card or function expansion unit which is inserted in or connected to the computer. Then, a CPU or the like equipped on the function expansion card or unit executes some or all of actual processing operations to implement the aforementioned functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-012962, filed Jan. 23, 2007, which is hereby incorporated by reference herein in its entirety.

What is claimed is:

1. A network device management apparatus, which is connected to a network and manages a network device connected to the network, said apparatus comprising:
    an acquisition unit, configured to acquire status information indicating a status of the network device from the network device;
    a status information saving unit, configured to save a first management window generated for browsing the status information of the network device acquired by said acquisition unit in a storage unit;
    an address notification unit, configured to generate a first URL required to access the storage unit and browse the saved first management window, and to notify a pre-registered destination of the generated first URL; and
    an information providing unit, configured to provide, when an access is made based on the first URL, the first management window saved in the storage unit to an accessing party,
    wherein said status information saving unit saves a second management window for browsing status information of the network device in the storage unit upon receiving an instruction for modifying a notification condition for a managed network device,
    wherein said address notification unit generates a second URL required to browse the saved second management window, to notify the pre-registered destination of the generated second URL, and to delete the first management window from the storage unit, and
    wherein the status information of the network device is displayed not on the first management window but on the second management window after the second management window has been generated.

2. The apparatus according to claim 1, further comprising a keyword saving unit adapted to save a pre-entered keyword,
    wherein said address notification unit notifies the pre-registered destination of the keyword saved in said keyword saving unit in addition to the first or second URL.

3. The apparatus according to claim 2, further comprising an update unit adapted to update a password required to access the storage unit and/or the keyword in response to an update request,
    wherein when said update unit updates the password and/or the keyword, said address notification unit regenerates the URL.

4. A network device management method in a network device management apparatus which is connected to a network and manages a network device connected to the network, said method comprising:

an acquisition step of acquiring status information indicating a status of the network device from the network device;

a status information saving step of saving a first management window generated for browsing the status information of the network device acquired in the acquisition step in a storage unit;

an address notification step of generating a first URL required to access the storage unit and browsing the saved first management window, and notifying a pre-registered destination of the generated first URL; and an information providing step of providing, when an access is made based on the first URL, the first management window saved in the storage unit to an accessing party, wherein the status information saving step saves a second management window for browsing status information of the network device in the storage unit upon receiving an instruction for modifying a notification condition for a managed network device, wherein said address notification step generates a second URL required to browse the saved second management window, notifying the pre-registered destination of the generated second URL, and deleting the first management window from the storage unit, and wherein the status information of the network device is displayed not on the first management window but on the second management window after the second management window has been generated.

5. The method according to claim 4, further comprising a keyword saving step of saving a pre-entered keyword, wherein the address notification step notifies the pre-registered destination of the keyword saved in the keyword saving step in addition to the first or second URL.

6. The method according to claim 5, further comprising an update step of updating a password required to access the storage unit and/or the keyword in response to an update request, wherein when the password and/or the keyword are/is updated in the update step, the address notification step regenerates the URL.

7. A non-transitory computer-readable storage medium storing a program for making a computer execute respective steps included in a method, the method comprising:

an acquisition step of acquiring status information indicating a status of the network device from the network device;

a status information saving step of saving a first management window generated for browsing the status information of the network device acquired in the acquisition step in a storage unit;

an address notification step of generating a first URL required to access the storage unit and browsing the saved first management window, and notifying a pre-registered destination of the generated first URL; and an information providing step of providing, when an access is made based on the first URL, the first management window saved in the storage unit to an accessing party, wherein the status information saving step saves a second management window for browsing status information of the network device in the storage unit upon receiving an instruction for modifying a notification condition for a managed network device, wherein said address notification step generates a second URL required to browse the saved second management window, notifying the pre-registered destination of the generated second URL, and deleting the first management window from the storage unit, and wherein the status information of the network device is displayed not on the first management window but on the second management window after the second management window has been generated.

8. A management apparatus, comprising:

a storage configured to store a first management window;

an address notification unit, configure to generate a first URL to be referred for accessing the storage and browsing the stored first management window, and to notify a pre-registered destination of the generated first URL; and an information provider, configured to provide the first management window stored in the storage to an accessing party, wherein said storage stores a second management window generated responsive to an instruction for modifying the URL for browsing the management window upon receiving the instruction, and wherein said address notification unit generates a second URL to be referred for accessing the storage and browsing the stored second management window, notifies the pre-registered destination of the generated second URL, and deletes the first URL from said storage.

* * * * *